US007532738B2

(12) United States Patent
Hashimoto et al.

(10) Patent No.: US 7,532,738 B2
(45) Date of Patent: May 12, 2009

(54) PRINT MEDIUM QUALITY ADJUSTMENT SYSTEM, INSPECTION WATERMARK MEDIUM OUTPUT DEVICE FOR OUTPUTTING WATERMARK MEDIUM TO UNDERGO INSPECTION, WATERMARK QUALITY INSPECTION DEVICE, ADJUSTED WATERMARK MEDIUM OUTPUT DEVICE, PRINT MEDIUM QUALITY ADJUSTMENT METHOD AND INSPECTION WATERMARK MEDIUM TO UNDERGO INSPECTION

(75) Inventors: Takashi Hashimoto, Saitama (JP); Kurato Maeno, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 111 days.

(21) Appl. No.: 10/593,598

(22) PCT Filed: Feb. 17, 2005

(86) PCT No.: PCT/JP2005/002390

§ 371 (c)(1), (2), (4) Date: Sep. 21, 2006

(87) PCT Pub. No.: WO2005/094058

PCT Pub. Date: Oct. 6, 2005

(65) Prior Publication Data

US 2007/0201719 A1 Aug. 30, 2007

(30) Foreign Application Priority Data

Mar. 29, 2004 (JP) ............................ 2004-097100
Sep. 10, 2004 (JP) ............................ 2004-263565

(51) Int. Cl.
*G06K 9/00* (2006.01)

(52) U.S. Cl. ..................................................... 382/100

(58) Field of Classification Search ....................... None
See application file for complete search history.

(56) References Cited

U.S. PATENT DOCUMENTS 5,871,288 A * 2/1999 Ryan et al. .................. 400/103
5,963,966 A * 10/1999 Mitchell et al. ............. 715/236
6,606,395 B1 * 8/2003 Rasmussen et al. ......... 382/112

(Continued)

FOREIGN PATENT DOCUMENTS

JP 05-020437 1/1993

(Continued)

*Primary Examiner*—Wenpeng Chen
(74) *Attorney, Agent, or Firm*—Rabin & Berdo, P.C.

(57) ABSTRACT

A print medium quality adjustment system includes an inspection watermark medium output device 11 having an inspection watermark signal generation unit 101 that generates at least one inspection watermark signal, generates a watermark signal image by disposing the inspection watermark signal(s) in an arbitrary arrangement, and generates inspection training data 105 having digitally recorded therein the inspection watermark signal(s). An inspection medium output unit 103 prints the inspection watermark image onto a medium. A watermark quality inspection device 12 has an output unit 106 that scans the printed medium, a signal detection unit 107 that extracts embedded watermark information, and a print quality judgment unit 108 that judges the watermark quality by comparing the extracted watermark information with the inspection training data. Based upon the quality judgment results, a print adjustment value 110 is generated to be used to improve the print quality.

16 Claims, 25 Drawing Sheets

U.S. PATENT DOCUMENTS

| | | | | |
|---|---|---|---|---|
| 7,058,215 | B2 | 6/2006 | Ikeda et al. | |
| 7,113,620 | B2 * | 9/2006 | Shiotani | 382/112 |
| 2002/0018228 | A1 * | 2/2002 | Torigoe | 358/1.14 |
| 2002/0131629 | A1 | 9/2002 | Ikeda et al. | |
| 2003/0020776 | A1 * | 1/2003 | Franzke et al. | 347/19 |
| 2003/0021442 | A1 | 1/2003 | Suzaki | |

FOREIGN PATENT DOCUMENTS

| | | |
|---|---|---|
| JP | 06320849 A * | 11/1994 |
| JP | 07-074926 | 3/1995 |
| JP | 8-298588 | 11/1996 |
| JP | 11-032202 | 2/1999 |
| JP | 11-177823 | 7/1999 |
| JP | 2001-285619 | 10/2001 |
| JP | 2002290713 | 10/2002 |
| JP | 2003-101762 | 4/2003 |
| JP | 2003-209676 | 7/2003 |
| JP | 2003-290713 | 10/2003 |
| JP | 2004-015093 | 1/2004 |

* cited by examiner

| | $E_0$ | $E_1$ | $E_2$ | $E_3$ | $E_4$ | $E_5$ |
|---|---|---|---|---|---|---|
| $B_1$ | 0 | 0 | 0 | 1 | | |
| $B_2$ | | 0 | 0 | 1 | 1 | |
| $B_3$ | | | 1 | 0 | 1 | 1 |
| TOTAL | 0 | 0 | 0 | 1 | 1 | 1 |

PRINT MEDIUM QUALITY ADJUSTMENT SYSTEM, INSPECTION WATERMARK MEDIUM OUTPUT DEVICE FOR OUTPUTTING WATERMARK MEDIUM TO UNDERGO INSPECTION, WATERMARK QUALITY INSPECTION DEVICE, ADJUSTED WATERMARK MEDIUM OUTPUT DEVICE, PRINT MEDIUM QUALITY ADJUSTMENT METHOD AND INSPECTION WATERMARK MEDIUM TO UNDERGO INSPECTION

BACKGROUND OF THE INVENTION

The present invention relates to a technology for embedding/reading an electronic watermark in a print medium, and more specifically, it relates to a print medium quality adjustment system, an inspection watermark medium output device for outputting a watermark medium for inspection, a watermark quality inspection device, an adjusted watermark medium output device, a print medium quality adjustment method and a medium to be used to inspect the watermark quality.

DESCRIPTION OF THE RELATED ART

There are technologies known in the related art whereby information is embedded in a print document by adopting an electronic watermarking technology. Such electronic watermarking technologies are adopted in a wide range of applications, e.g. managing a print document by adding digital information thereto and detecting tampering on a print document. For instance, "Method for Embedding and Detecting Classified Information in a Print Document" disclosed in Japanese Laid Open Patent Publication No. 2003-209676, allows privileged information such as document management information to be embedded in a print document as a watermark image. The recipient of the watermarked document obtains the privileged information by reading the document with a scanner device.

The quality of a printout is normally affected by the printing mechanism of the printer or the printer model used in conjunction with a specific printing method. In addition, even on a single printer, the quality the printed medium may change in an unpredictable manner depending upon the remaining toner quantity, the extent to which the printing head has become worn and the like. Furthermore, the print quality may change on the same medium material depending upon the printing position on the medium. Japanese Laid Open Patent Publication No. H5-20437 discloses a "print quality evaluation method" through which such varying print quality levels can be evaluated. The publication discloses a method for evaluating the quality of print on a sheet printed with a printer device by printing a density gradation pattern, a line pattern, a plain pattern or the like onto an evaluation sheet.

The quality of an electronic watermark printed onto a print medium, too, is affected by the factors listed above. Especially since the watermark is often printed as a pattern smaller than characters and the like, the watermark information reading accuracy is greatly affected by the level of the print quality. Accordingly, in order to assure a high quality product, a highly reliable print quality inspection must be executed and if the accuracy with which the watermark embedded in the medium is read is poor, the printing parameters must be optimized to suit the particular printing environment.

(Patent reference literature 1) Japanese Laid Open Patent Publication No. 2003-209676

(Patent reference literature 2) Japanese Laid Open Patent Publication No. H5-20437

SUMMARY OF THE INVENTION

In a print quality inspection method in the related art, a print medium having known print information printed with specific printing parameters is inspected and then the inspection results are compared with the print information. However, the printing parameters must be adjusted each time the parameters change by outputting and checking a print medium, and thus, the method is labor-intensive.

An object of the present invention, which has been completed by addressing the problem of the print quality inspection technology in the related art discussed above, is to provide a new and improved print medium quality adjustment system, an inspection watermark medium output device for outputting a watermark medium to undergo inspection, a watermark quality inspection device, an adjusted watermark medium output device, a print medium quality adjustment method and an inspection watermark medium to be used for inspection, all to be adopted to efficiently evaluate and adjust the quality of an electronic watermark in a comprehensive manner.

MEANS FOR SOLVING THE PROBLEMS

The object described above is achieved in an aspect of the present invention by providing a print medium quality adjustment system comprising an inspection watermark medium output device that outputs a watermark medium to be used to inspect a print medium and a watermark quality inspection device that inspects the watermark quality in the print medium.

The inspection watermark medium output device includes an inspection watermark signal generation unit that generates a single inspection watermark signal or a plurality of inspection watermark signals to be used for inspection, generates a watermark signal image by disposing the watermark signal(s) in an arbitrary arrangement and generates inspection training data having digitally recorded therein the inspection watermark signal(s) and an inspection medium output unit that outputs an inspection watermark medium to be used for inspection created by printing the inspection watermark image onto a medium.

The watermark quality inspection device includes an input unit that takes in the inspection watermark medium as a multi-value gradation input image, a signal detection unit that detects a signal embedded in the input image and extracts embedded watermark information, a print quality judgment unit that judges watermark quality by comparing the watermark information with the inspection training data input thereto and a print adjustment value output unit that, based upon the results of the quality judgment, outputs a print adjustment value to be used to improve the print quality.

In the system described above, the print adjustment value to be used to adjust the watermark print quality of a watermark printed on a medium in a given watermark printing environment can be output simply by outputting and inspecting a single inspection medium. Thus, the quality of an electronic watermark can be evaluated and adjusted to the full extent without having to expend a great deal of labor.

The print medium quality adjustment system according to the present invention allows for the following applications.

The system may further include an adjusted watermark medium output device that outputs an adjusted print medium based upon the print adjustment value input thereto. The adjusted watermark medium output device may comprise a document image generation unit that creates a document image printed on a medium based upon document data, a watermark information generation unit that N-dimensionally (N is a value equal to or greater than 2) codes data indicating a numerical value, which are obtained by digitizing embed information to be embedded in a medium as a watermark signal, a print adjustment value input unit to which the print adjustment value is input, an adjusted watermark image generation unit that generates a watermark image based upon the document image and the watermark information by using the print adjustment value and a medium output unit that outputs and adjusted watermark medium created by printing the watermark image onto a medium.

In this system, based upon the print adjustment value obtained by inspecting a single inspection medium and input to the print adjustment value input unit, the watermark print quality in the print medium is adjusted so as to print out a high-quality watermark medium. Thus, the quality of an electronic watermark can be evaluated and adjusted to the full extent without having to expend a great deal of labor.

The print adjustment value output unit may determine an adjustment value, which is dependent on the position assumed at the print medium, in correspondence to the difference between the inspection training data and the watermark signal detected by the signal detection unit and then output the adjustment value thus determined as the print adjustment value. In a printing environment in which the print quality becomes poor at a specific position on the print medium, the density level of the watermark signal can be raised locally instead of raising the overall density level so as to minimize the extent to which the legibility of the watermark medium becomes poor by adopting the structure described above.

The inspection watermark signal generation unit may embed at least part of the inspection training data in the inspection watermark signal by using an error-proof code, and the print adjustment value output unit may recover the inspection training data from the watermark signal detected by the signal detection unit. In this case, the print adjustment value can be output simply by using the inspection medium without having to enter the inspection training data to the watermark quality inspection device.

The print quality judgment unit may divide adjustment values, each determined in correspondence to a specific position at the print medium into groups each representing one of an arbitrary number of areas, set in an area with an adjustment value equal to or greater than a predetermined threshold value as a high-error area and designate the high-error area as a dummy watermark area with no information contained therein. Thus, even when there is a low-quality area where a detection error may occur readily even after executing the density level-based adjustment, watermark information can be embedded by avoiding such a low-quality area so as to sustain the watermark print quality at a desired level. In addition, print adjustment can be executed while sustaining uniform watermark density.

The inspection watermark medium output device may generate a plurality of inspection watermark signals, and the print adjustment value output unit may determine the print medium position-dependent adjustment value by executing tabulation processing (e.g., majority operation) on the plurality of inspection watermark signals. In this case, the print adjustment value is determined by tabulating inspection information corresponding to a plurality of inspection watermark media and thus, an even higher level of precision is achieved in the print adjustment.

The adjusted watermark medium output device may be connected via a network with the inspection watermark medium output device and the watermark quality inspection device so as to receive at least the watermark image via the network. This structure enables highly accurate watermark printing even when a watermarked document originating from a remote location is printed out.

It is to be noted that the print adjustment value, too, may be received via the network.

The inspection watermark signal generation unit may embed characteristics information indicating document image characteristics, which is needed for tampering detection processing in the inspection watermark. In this case, the tampering detection rate is factored in when adjusting the print quality of a watermark in a print medium to be used in tampering detection and, as a result, a watermark medium that enables highly accurate tampering detection can be printed out.

The print adjustment value output unit may output as the print adjustment value a watermark printing parameter that satisfies a predetermined allowable recognition error rate (error recognition rate for character recognition) by adopting a character recognition technology. In this case, the print quality of a watermark print medium that undergoes OCR (optical character recognition) processing can be adjusted by taking into consideration the character recognition rate, which, in turn, makes it possible to print out a watermark medium enabling highly accurate OCR processing.

A plurality of signals that vary from one another and express identical information may be provided as inspection watermark signals.

The inspection watermark signal may be a two-dimensional barcode signal (a signal used to form a two-dimensional barcode).

A printing parameter of an inspection watermark signal may be determined based upon a change in the print density value for the watermark signal image.

A printing parameter of the inspection watermark signal may be determined based upon a change in the arrangement of the pixels constituting the watermark signal image.

In a second aspect of the present invention, an inspection watermark medium output device that outputs an inspection watermark medium to be used to inspect a print medium is provided. The inspection watermark medium output device according to the present invention comprises an inspection watermark signal generation unit that generates a single inspection watermark signal or a plurality of inspection watermark signals, generates a watermark signal image by disposing the inspection watermark signal(s) in an arbitrary arrangement and generates inspection training data having digitally recorded therein the inspection watermark signal(s) and an inspection medium output unit that outputs an inspection watermark medium by printing the inspection watermark image on a medium.

This structure enables an adjustment of the watermark print quality of a watermark on a print medium so as to suit the particular watermark printing environment simply by outputting and inspecting a single inspection medium. Thus, the quality of an electronic watermark can be evaluated and adjusted to the full extent without having to expend a great deal of labor.

The inspection watermark medium output device according to the present invention allows for the following applications.

The inspection watermark medium output device may further include a watermark medium compression unit that compresses the inspection watermark medium. Such an inspection watermark medium output device, which compresses the watermark image, facilitates data exchange via a network. This structure enables highly accurate watermark printing even when a watermarked document originating from a remote location is printed out.

The inspection watermark signal generation unit may embed characteristics information indicating document image characteristics, which is needed for tampering detection processing in the inspection watermark. In this case, the tampering detection rate is factored in when adjusting the print quality of a watermark in a print medium to be used in tampering detection and, as a result, a watermark medium that enables highly accurate tampering detection can be printed out.

A plurality of signals that vary from one another and express identical information may be provided as inspection watermark signals.

The inspection watermark signal may be a two-dimensional barcode signal (a signal used to form a two-dimensional barcode).

A printing parameter of an inspection watermark signal may be determined based upon a change in the print density value for the watermark signal image.

A printing parameter of the inspection watermark signal may be determined based upon a change in the arrangement of the pixels constituting the watermark signal image.

In a third aspect of the present invention, a watermark quality inspection device that inspects the watermark quality of a watermark in a print medium by using an inspection watermark medium and inspection training data input thereto is provided. The watermark quality inspection device according to the present invention comprises an input units that takes in the inspection watermark medium as a multi-value gradation input image, a signal detection unit that detects the signal embedded in the input image and extracts embedded watermark information, a print quality judgment unit that judges the watermark quality by comparing the watermark information with inspection training data and a print adjustment value output unit that outputs based upon the results of the quality judgment a print adjustment value to be used to improve the print quality.

In conjunction with such a watermark quality inspection device, the watermark print quality of a watermark print medium can be adjusted and a high-quality watermark medium can be printed by using the print adjustment value obtained through an inspection of a single inspection medium as input data. Thus, the quality of an electronic watermark can be evaluated and adjusted to the full extent without having to expend a great deal of labor.

The watermark quality inspection device according to the present invention allows for the following applications.

The print adjustment value output unit may determine an adjustment value, which is dependent on the position assumed at the print medium, in correspondence to the difference between the inspection training data and the watermark signal detected by the signal detection unit and then output the adjustment value thus determined as the print adjustment value. In a printing environment in which the print quality becomes poor at a specific position on the print medium, the density level of the watermark signal can be raised locally instead of raising the overall density level so as to minimize the extent to which the legibility of the watermark medium becomes poor by adopting the structure described above.

The inspection watermark signal generation unit may embed at least part of the inspection training data in the inspection watermark signal by using an error-proof code, and the print adjustment value output unit may recover the inspection training data from the watermark signal detected by the signal detection unit. In this case, the print adjustment value can be output simply by using the inspection medium without having to enter the inspection training data to the watermark quality inspection device.

The print quality judgment unit may divide adjustment values, each determined in correspondence to a specific position at the print medium into groups each representing one of an arbitrary number of areas, set in an area with an adjustment value equal to or greater than a predetermined threshold value as a high-error area and designate the high-error area as a dummy watermark area with no information contained therein. Thus, even when there is a low-quality area where a detection error may occur readily even after executing the density level-based adjustment, watermark information can be embedded by avoiding such a low-quality area so as to sustain the watermark print quality at a desired level. In addition, print adjustment can be executed while sustaining uniform watermark density.

The inspection watermark medium output device may generate a plurality of inspection watermark signals, and the print adjustment value output unit may determine the print medium position-dependent adjustment value by executing tabulation processing (e.g., majority operation) on the plurality of inspection watermark signals. In this case, the print adjustment value is determined by tabulating inspection information corresponding to a plurality of inspection watermark media and thus, an even higher level of precision is achieved in the print adjustment.

The print adjustment value output unit may output as the print adjustment value a watermark printing parameter that satisfies a predetermined allowable recognition error rate (error recognition rate for character recognition) by adopting a character recognition technology. In this case, the print quality of a watermark print medium that undergoes OCR processing can be adjusted by taking into consideration the character recognition rate, which, in turn, makes it possible to print out a watermark medium enabling highly accurate OCR processing.

In a fourth aspect of the present invention, an adjusted watermark medium output device that outputs an adjusted print medium based upon a print adjustment value input thereto is provided. The adjusted watermark medium output device according to the present invention comprises a document image generation unit that creates a document image printed on a medium based upon document data, a watermark information generation unit that N-dimensionally (N is a value equal to or greater than 2) encodes data indicating a numerical value, which are obtained by digitizing embed information to be embedded in a medium as a watermark signal, a print adjustment value input unit to which the print adjustment value is input, an adjusted watermark image generation unit that generates a watermark image based upon the document image and the watermark information by using the print adjustment value and a medium output unit that outputs an adjusted watermark medium created by printing the watermark image onto a medium.

In the adjusted watermark medium output device, based upon the print adjustment value obtained by inspecting a single inspection medium and input to the print adjustment value input unit, the watermark print quality in the print medium is adjusted so as to print out a high-quality watermark medium. Thus, the quality of an electronic watermark can be evaluated and adjusted to the full extent without having to expend a great deal of labor.

In a fifth aspect of the present invention, a print medium quality adjustment system comprising an inspection watermark output step in which a watermark medium to be used to inspect a print medium is output and a watermark quality inspection step in which the watermark quality in the print medium is inspected, is provided.

The inspection watermark output step includes an inspection watermark signal generation step in which a single inspection watermark signal or a plurality of inspection watermark signals to be used for inspection are generated, a watermark signal image is generated by disposing the watermark signal(s) in an arbitrary arrangement, and inspection training data having digitally recorded therein the inspection watermark signal(s) are generated and an inspection medium output step in which an inspection watermark medium to be used for inspection created by printing the inspection watermark image onto a medium, is output.

The watermark quality inspection step includes an input step in which the inspection watermark medium is taken in as a multi-value gradation input image, a signal detection step in which a signal embedded in the input image is detected and embedded watermark information is extracted, a print quality judgment step in which the inspection training data are input and the watermark quality is judged by comparing the watermark information with the inspection training data and a print adjustment value output step in which a print adjustment value to be used to improve the print quality is output based upon the results of the quality judgment.

In the method described above, the print adjustment value to be used to adjust the watermark print quality of a watermark on a print medium so as to suit the particular watermark printing environment can be output simply by outputting and inspecting a single inspection medium. Thus, the quality of an electronic watermark can be evaluated and adjusted to the full extent without having to expend a great deal of labor.

The print medium quality adjustment method according to the present invention allows for the following applications.

The method may further include an adjusted watermark medium output step in which the print adjustment value is input and an adjusted print medium is output based upon the print adjustment value. The adjusted watermark medium output step may include a document image generation step in which a document image printed on a medium based upon document data is created, a watermark information generation step in which data indicating a numerical value, which are obtained by digitizing embed information to be embedded in a medium as a watermark signal, are N-dimensionally encoded (N is a value equal to or greater than 2), a print adjustment value input step in which the print adjustment value is input, an adjusted watermark image generation step in which a watermark image is generated based upon the document image and the watermark information by using the print adjustment value and a medium output step in which an adjusted watermark medium created by printing the watermark image onto a medium is output.

In this method, based upon the print adjustment value obtained by inspecting a single inspection medium and used as input data, the watermark print quality in the print medium is adjusted so as to print out a high-quality watermark medium. Thus, the quality of an electronic watermark can be evaluated and adjusted to the full extent without having to expend a great deal of labor.

In the print adjustment value output step, an adjustment value dependent on the position on the print medium may be determined in correspondence to the difference between the value indicated in the inspection training data and the value indicated in the watermark signal detected in the signal detection step and the adjustment value thus determined may be output as the print adjustment value. In a printing environment in which the print quality becomes poor at a specific position on the print medium, the density level of the watermark signal can be raised locally instead of raising the overall density level so as to minimize the extent to which the legibility of the watermark medium becomes poor by adopting the method described above.

In the inspection watermark signal generation step, at least part of the inspection training data may be embedded in the inspection watermark signal by using an error-proof code. Then, in the print adjustment value output step, the inspection training data may be recovered from the watermark signal detected in the signal detection step. In this case, the print adjustment value can be output simply by using the inspection medium without having to enter the inspection training data to the watermark quality inspection device.

In the print quality judgment step, the print medium position-dependent adjustment values may be divided in correspondence to an arbitrary number of areas, an area with an adjustment value equal to or greater than a predetermined threshold value may be set as a high-error area and the high-error area may be designated as a dummy watermark area with no information contained therein. When there is a low-quality area where a detection error may occur readily even after executing the density level-based adjustment, watermark information can be embedded by avoiding such a low-quality area so as to sustain the watermark print quality at a desired level by adopting the method which includes this print quality judgment step. In addition, print adjustment can be executed while sustaining uniform watermark density.

In the inspection watermark output step, a plurality of inspection watermark signals may be generated, and in the print adjustment value output step, print medium position-dependent adjustment values may be determined by executing tabulation processing (e.g., majority operation) on the plurality of inspection watermark signals. In this case, the print adjustment value is determined by tabulating the inspection information corresponding to a plurality of inspection watermark media and thus, an even higher level of precision is achieved in the print adjustment.

In the adjusted watermark medium output step, the watermark image, at least, may be received via a network. Such data exchange via a network enables highly accurate watermark printing even when a watermarked document originating from a remote location is printed out.

It is to be noted that the print adjustment value, too, may be received via the network.

In the inspection watermark signal generation step, characteristics information indicating document image characteristics may be embedded in the inspection watermark. In this case, the tampering detection rate is factored in when adjusting the print quality of a watermark in a print medium to be used in tampering detection and, as a result, a watermark medium that enables highly accurate tampering detection can be printed out.

In the print adjustment value output step, a watermark printing parameter that satisfies a predetermined allowable recognition error rate (error recognition rate for character recognition) may be output as the print adjustment value by adopting a character recognition technology. In this case, the print quality of a watermark in a print medium that undergoes OCR processing can be adjusted by taking into consideration the character recognition rate, which, in turn, makes it possible to print out a watermark medium enabling highly accurate OCR processing.

A plurality of signals that vary from one another and express identical information may be provided as inspection watermark signals.

The inspection watermark signal may be a two-dimensional barcode signal (a signal used to form a two-dimensional barcode).

A printing parameter of the inspection watermark signal may be determined based upon a change in the print density value for the watermark signal image.

A printing parameter of the inspection watermark signal may be determined based upon a change in the arrangement of the pixels constituting the watermark signal image.

In a sixth aspect of the present invention, an inspection watermark medium to be used to inspect a print medium is provided. The inspection watermark medium according to the present invention is obtained by generating a single inspection watermark signal or a plurality of inspection watermark signals, disposing the inspection watermark signal(s) in an arbitrary arrangement so as to generate a watermark signal image and printing the inspection watermark image onto a medium.

This structure enables an adjustment of the watermark print quality of a watermark on a print medium so as to suit the particular watermark printing environment simply by outputting and inspecting a single inspection medium. Thus, the quality of an electronic watermark can be evaluated and adjusted to the full extent without having to expend a great deal of labor.

The inspection watermark medium according to the present invention allows for the following applications.

A plurality of signals that vary from one another and express identical information may be provided as inspection watermark signals.

The inspection watermark signal may be a two-dimensional barcode signal (a signal used to form a two-dimensional barcode).

A printing parameter of the inspection watermark signal may be determined based upon a change in a print density value for the watermark signal image.

A printing parameter of an inspection watermark signal may be determined based upon a change in the arrangement of the pixels constituting the watermark signal image.

In a seventh aspect of the present invention, an inspection watermark medium output device that outputs an inspection watermark medium (inspection sheet) to be used to inspect a print medium is provided. The inspection watermark medium output device according to the present invention comprises an inspection pattern input unit to which a plurality of inspection patterns are input, an inspection parameter input unit to which an inspection parameter is input, an inspection watermark medium design unit that disposes the inspection patterns on an inspection watermark medium and an inspection watermark medium output unit that outputs the inspection watermark medium having been designed by the inspection watermark medium design unit. The inspection watermark medium design unit divides the inspection watermark medium into a plurality of pattern areas, generates an inspection pattern group to be used for inspection based upon the inspection patterns and the inspection parameter and disposes an inspection pattern to be set for each pattern area in correspondence to its position on the inspection watermark medium.

The inspection watermark medium output device adopting the structure described above allows an inspection watermark medium to be automatically designed simply by providing a plurality of inspection patterns and a parameter corresponding to an inspection range.

The inspection watermark medium output device according to the present invention allows for the following applications.

The inspection patterns may include at least one of; a dot pattern, a density pattern, a line pattern, a character pattern and a gradation pattern.

The inspection watermark medium design unit may designate patterns in the inspection pattern group to at least one sub pattern group, and dispose the individual sub pattern groups at inspection watermark media different from one another. In conjunction with such an inspection watermark medium design unit, a quality inspection watermark medium to be used in quality inspection that enables printing position-based quality evaluation can be automatically designed by disposing a single inspection pattern at a plurality of positions on the inspection watermark media.

The inspection watermark medium design unit may dispose a single inspection pattern in a plurality of pattern areas different from one another (dispose a single inspection pattern repeatedly) if the number of patterns in the sub-pattern group is smaller than the number of pattern areas at the inspection watermark medium.

The inspection watermark medium design unit may calculate the number of inspection watermark media heeded for an inspection based upon the inspection parameter input thereto and the size of the inspection sheet.

When calculating the number of inspection watermark media, the inspection watermark medium design unit may determine the number of inspection patterns to be used in the inspection based upon the inspection parameter and may designate the result of a division operation executed by using the number of areas present along the shorter side of the inspection sheet and the number of inspection patterns as the number of inspection watermark media.

The inspection watermark medium design unit may divide the inspection watermark medium into pattern areas forming a lattice, dispose a single type of inspection pattern at each coordinate point present along a side of the inspection watermark medium at least once and adjust the coordinates of each inspection pattern along the subtense of a side of the inspection watermark medium so as to allow the inspection pattern to be disposed at each coordinate point along the subtense at least once. This inspection watermark medium design unit allows the inspection pattern to be evenly distributed on the inspection watermark medium, and automatically generates an inspection watermark medium that enables highly accurate printing position-based quality evaluation with a minimum number of inspection watermark media.

The coordinates of the inspection pattern may be adjusted by generating an arithmetic sequence that includes terms each representing a coordinate assumed along one side of the inspection watermark medium and determining the coordinate by using the arithmetic sequence and the number of areas present along the direction separating the side from the opposite side.

The common difference in the arithmetic sequence may assume a value determined in correspondence to the number of areas present along the direction separating the side from the opposite side.

In another aspect of the present invention, a program that enables a computer to function as the inspection watermark medium output device, the watermark quality inspection device or the adjusted watermark medium output device and a computer-readable recording medium having recorded therein the program are provided. The program may be written in any programming language. In addition, the recording medium may be any recording medium commonly used at present or any recording medium that may be put to practical use in the future, such as a CD-ROM, a DVD-ROM or a flexible disk in which the program can be recorded.

As explained above, the present invention enables comprehensive electronic watermark quality evaluation and adjustment without requiring significant labor.

THE BRIEF DESCRIPTION OF THE DRAWINGS

FIG. 1 shows the structure adopted in a first embodiment;

FIG. 2 presents a flowchart of the operations executed in the first embodiment;

FIG. 3 presents a detailed flowchart of the inspection watermark generation processing (S111);

Figure 6:
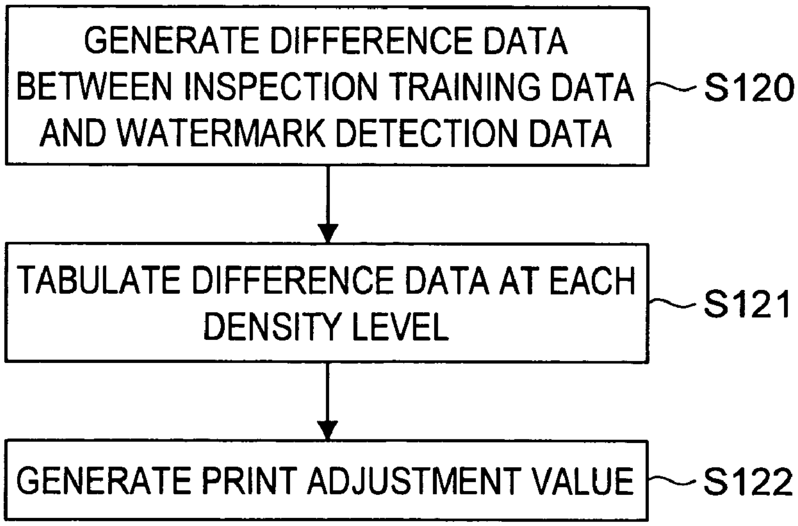
Figure 7:
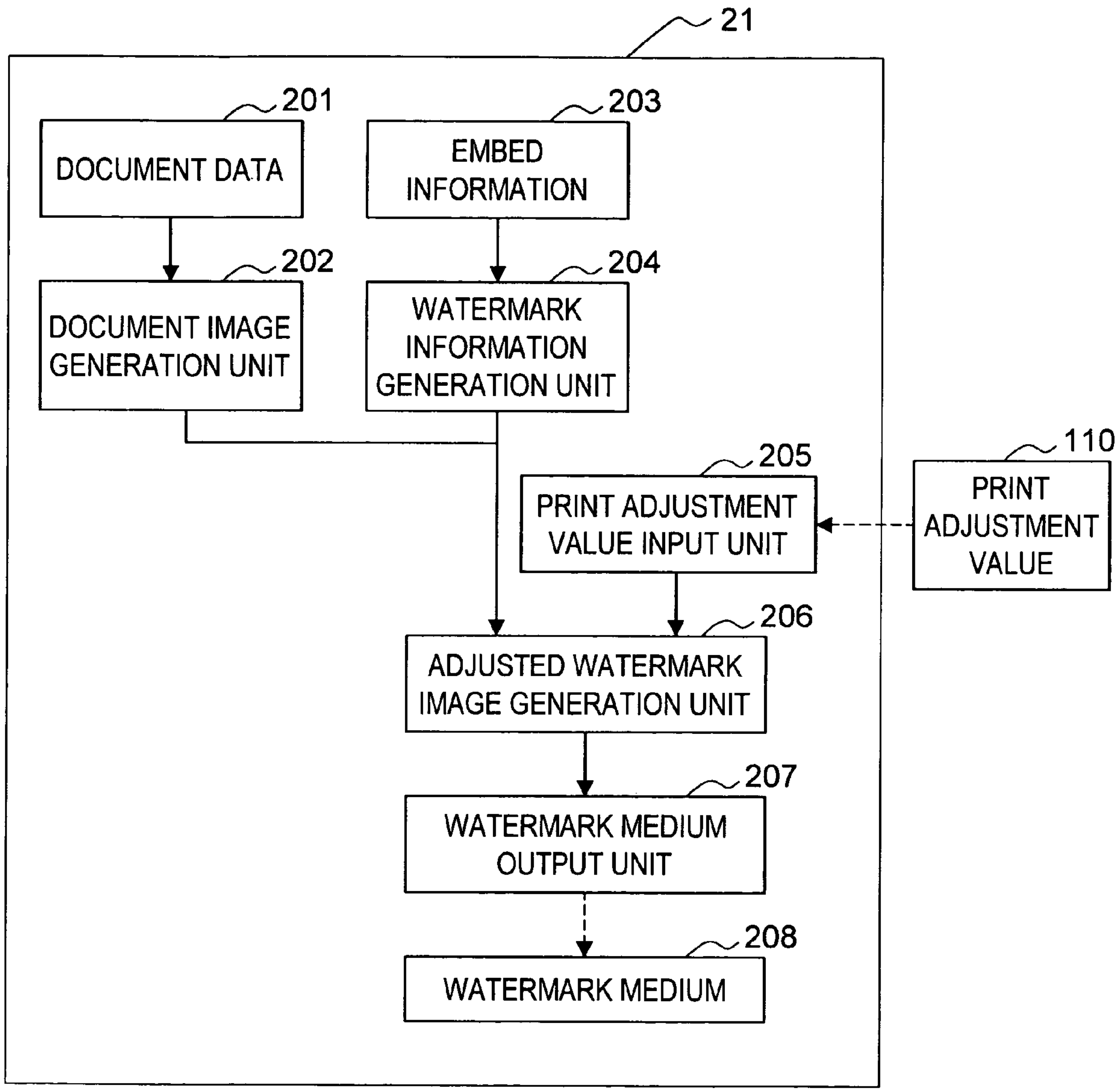
Figure 8:
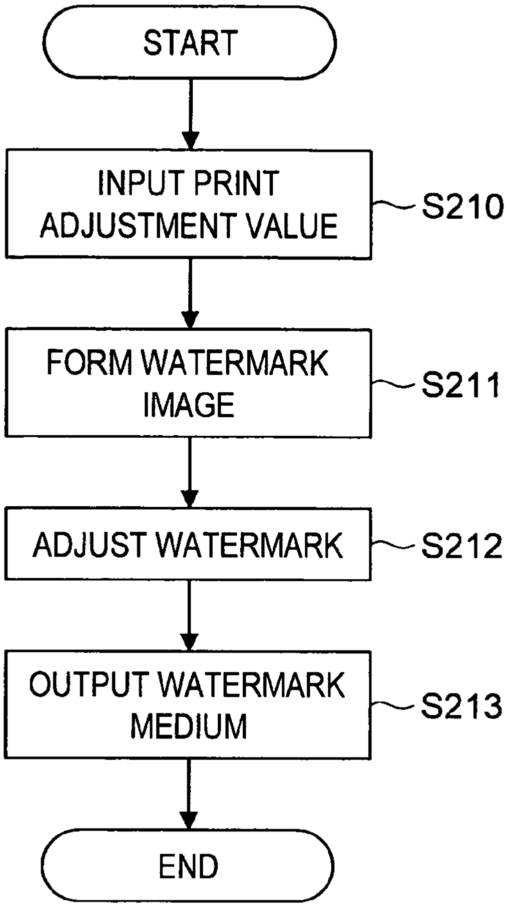
Figure 9:
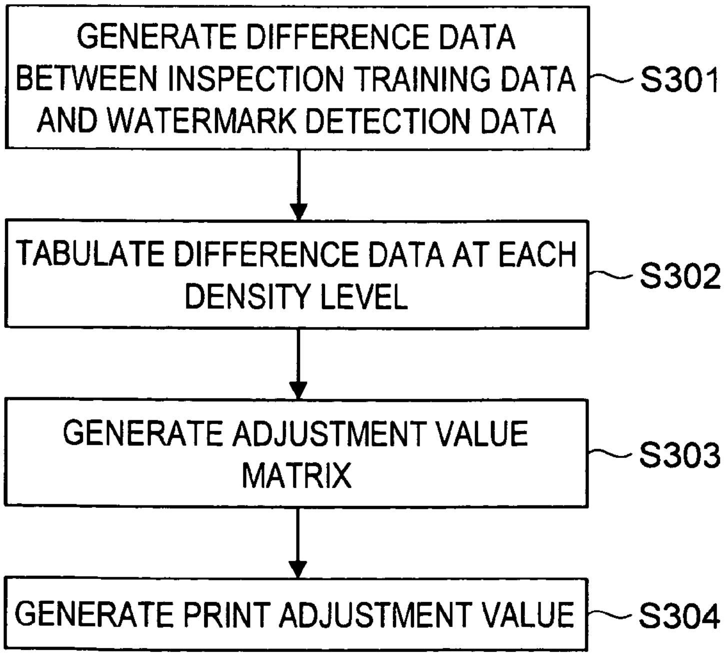
Figure 10:
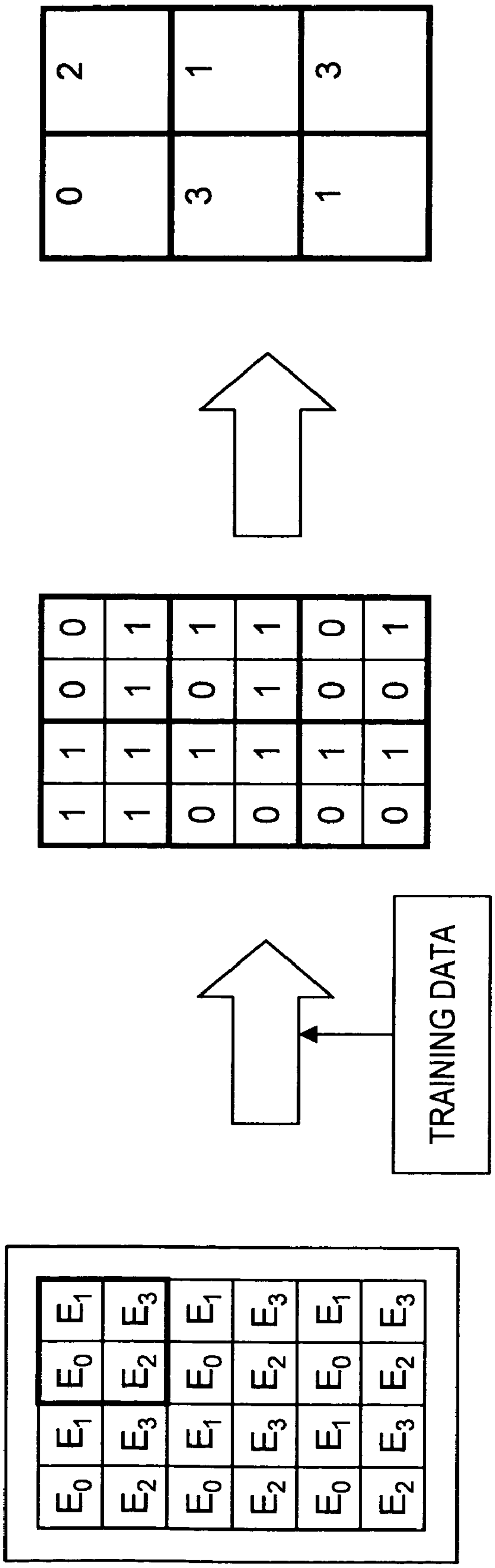
Figure 11:
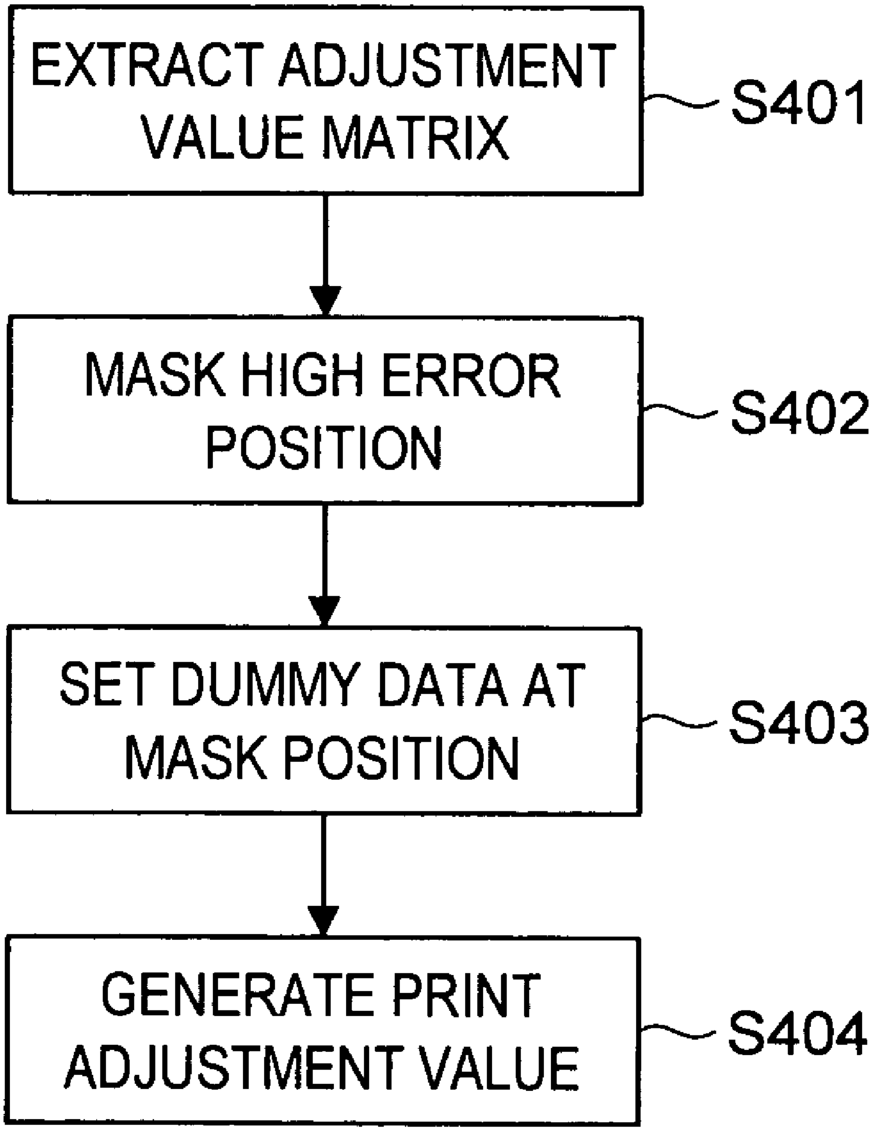
Figure 12:
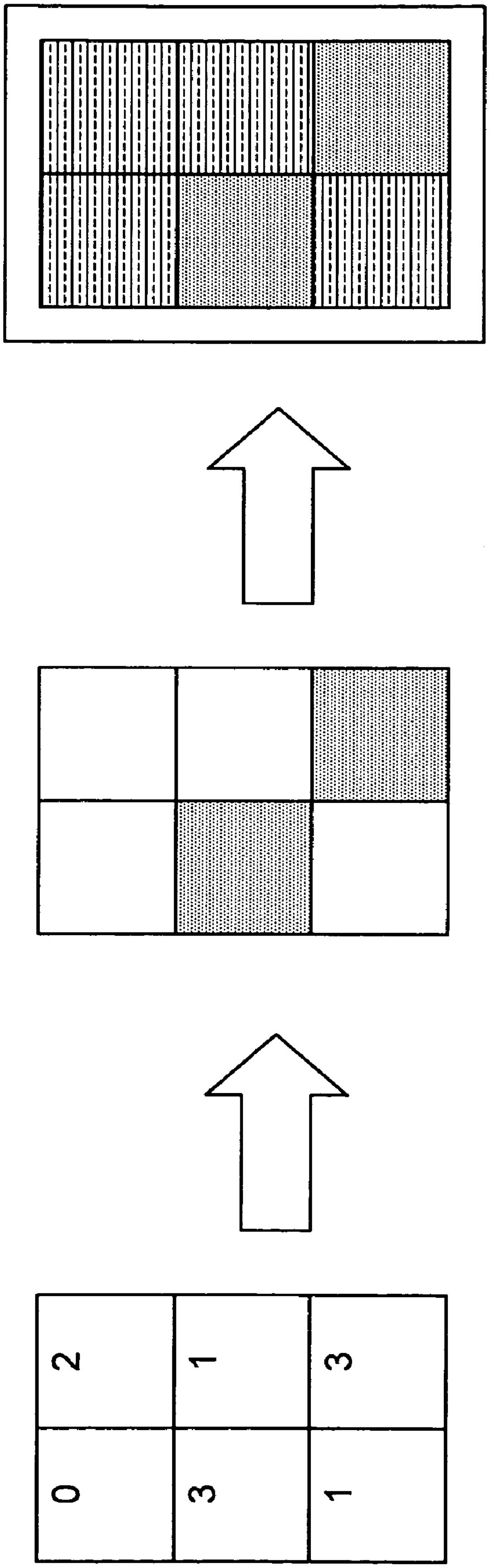
Figure 13:
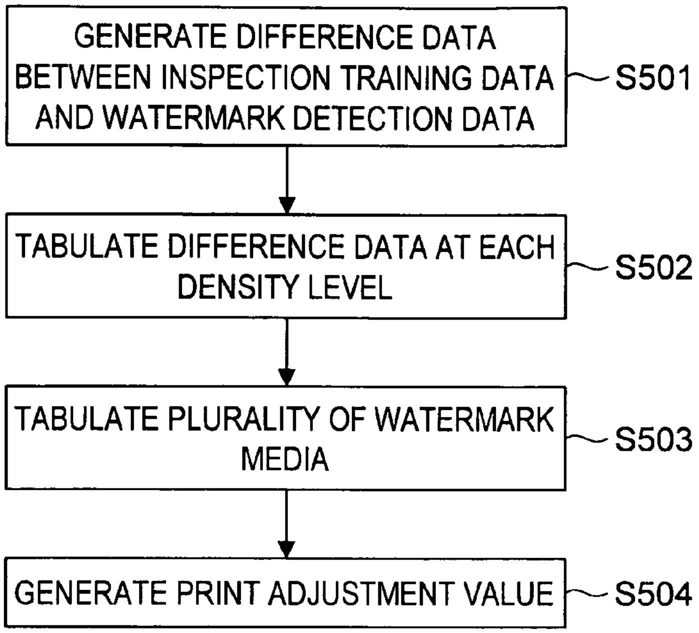
Figure 14:
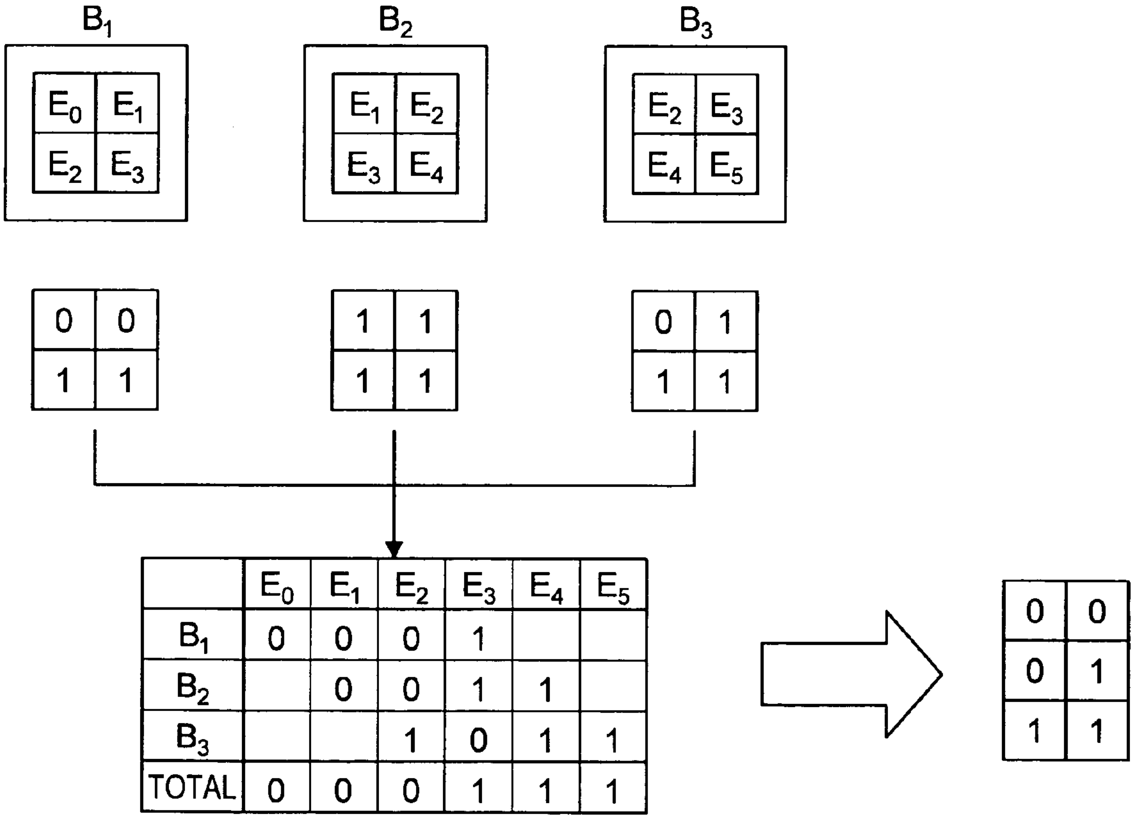
Figure 15:
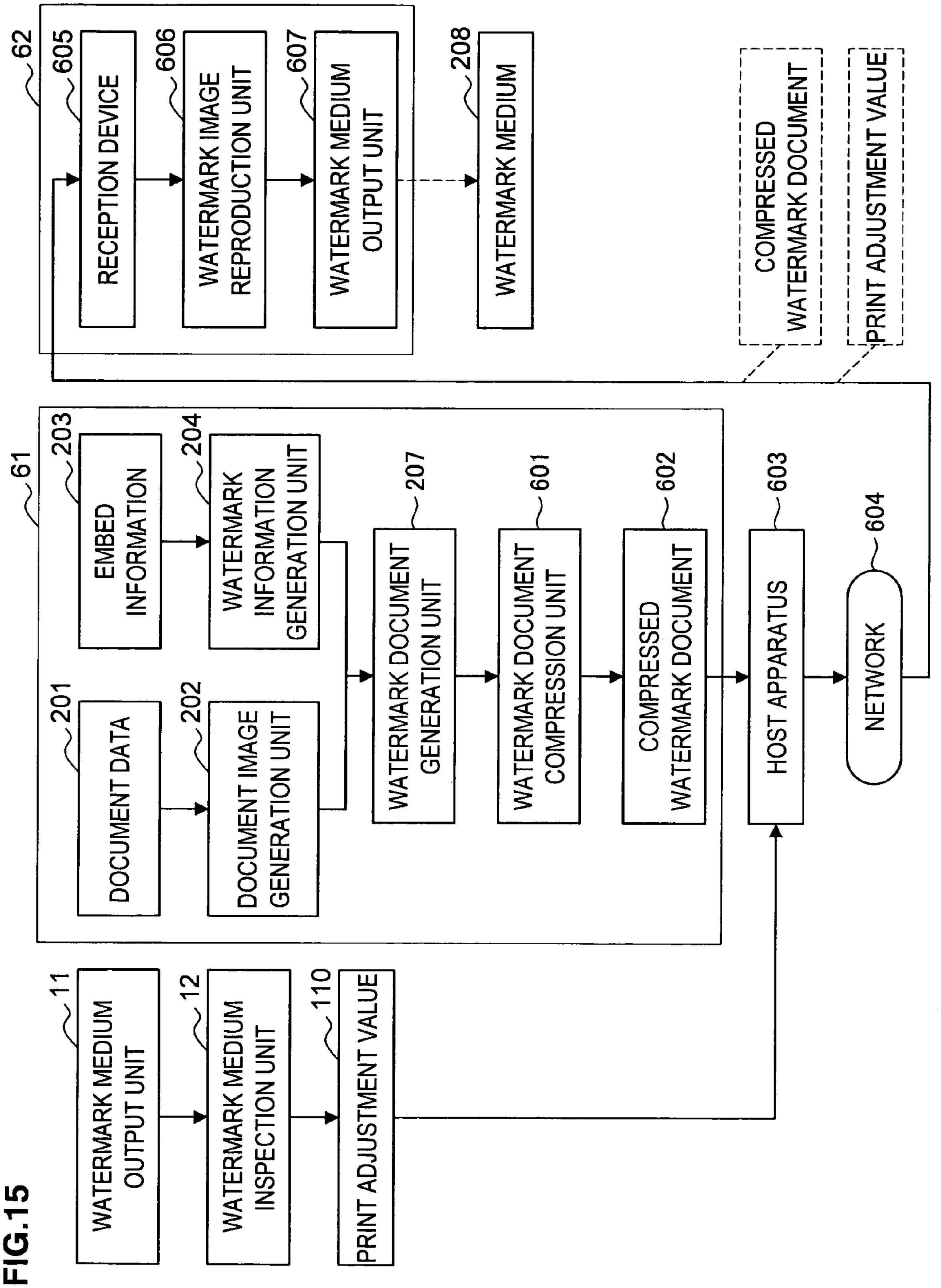
Figure 16:
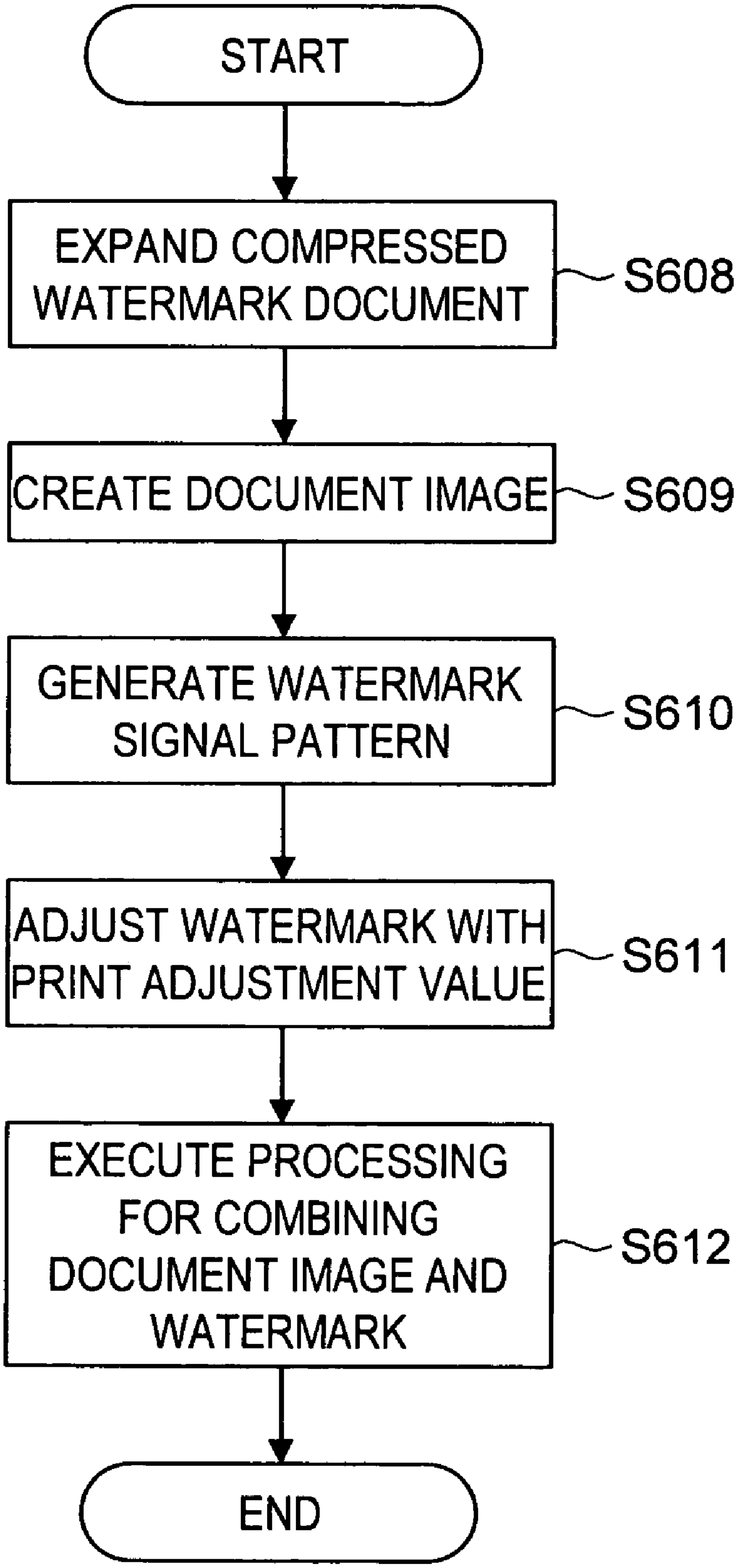
Figure 17:
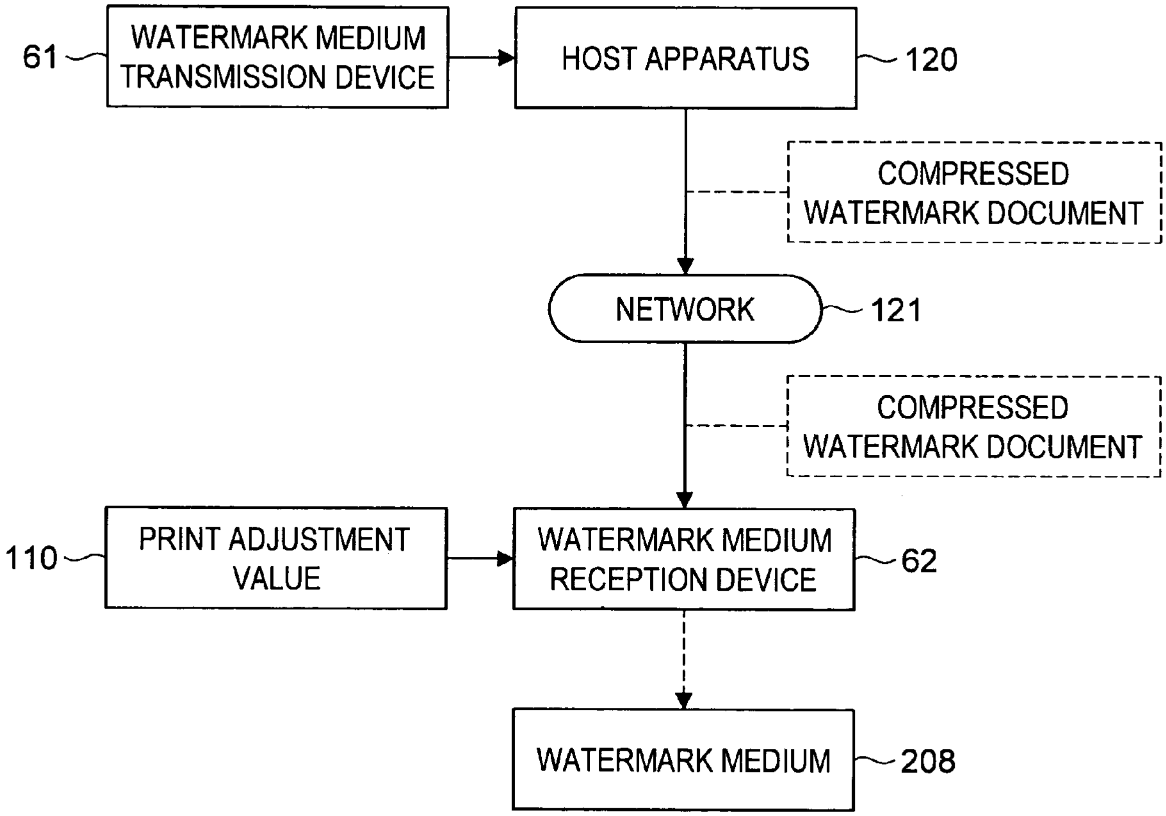
Figure 18:
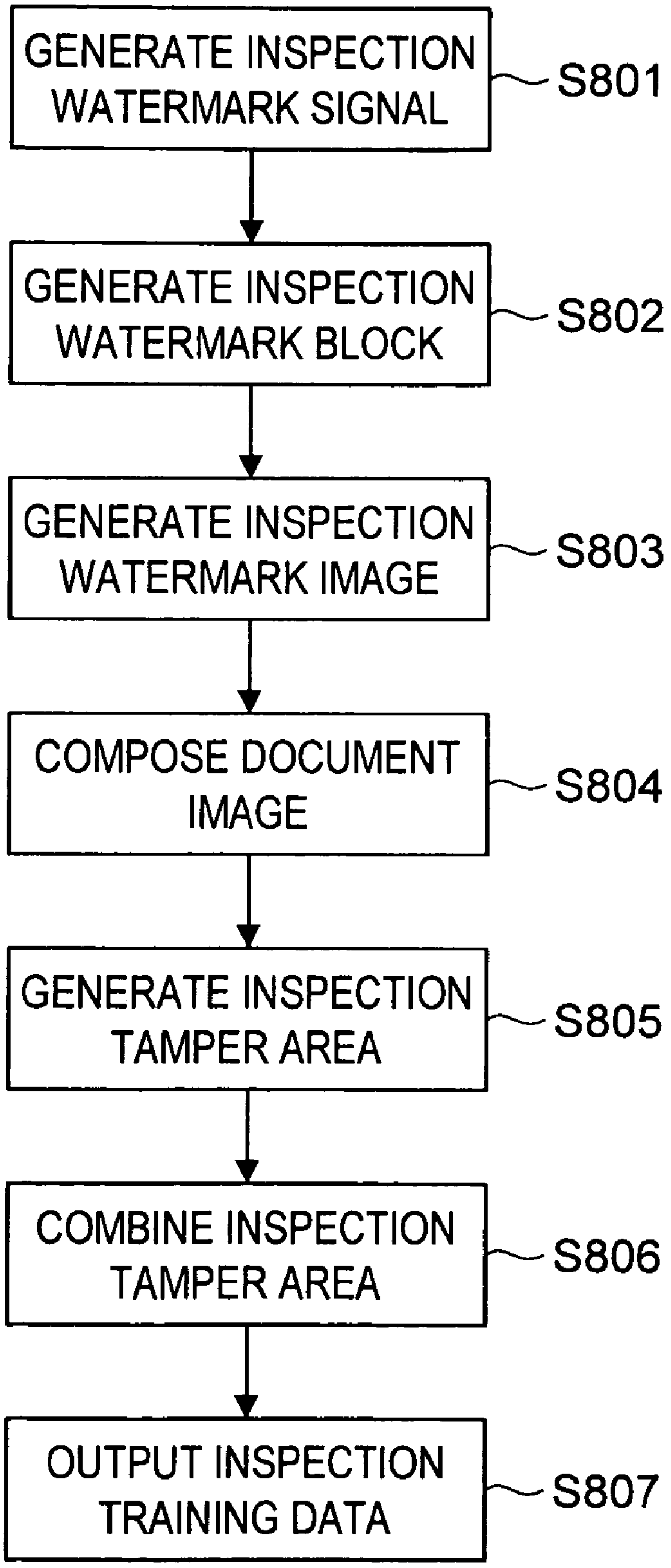
Figure 19:
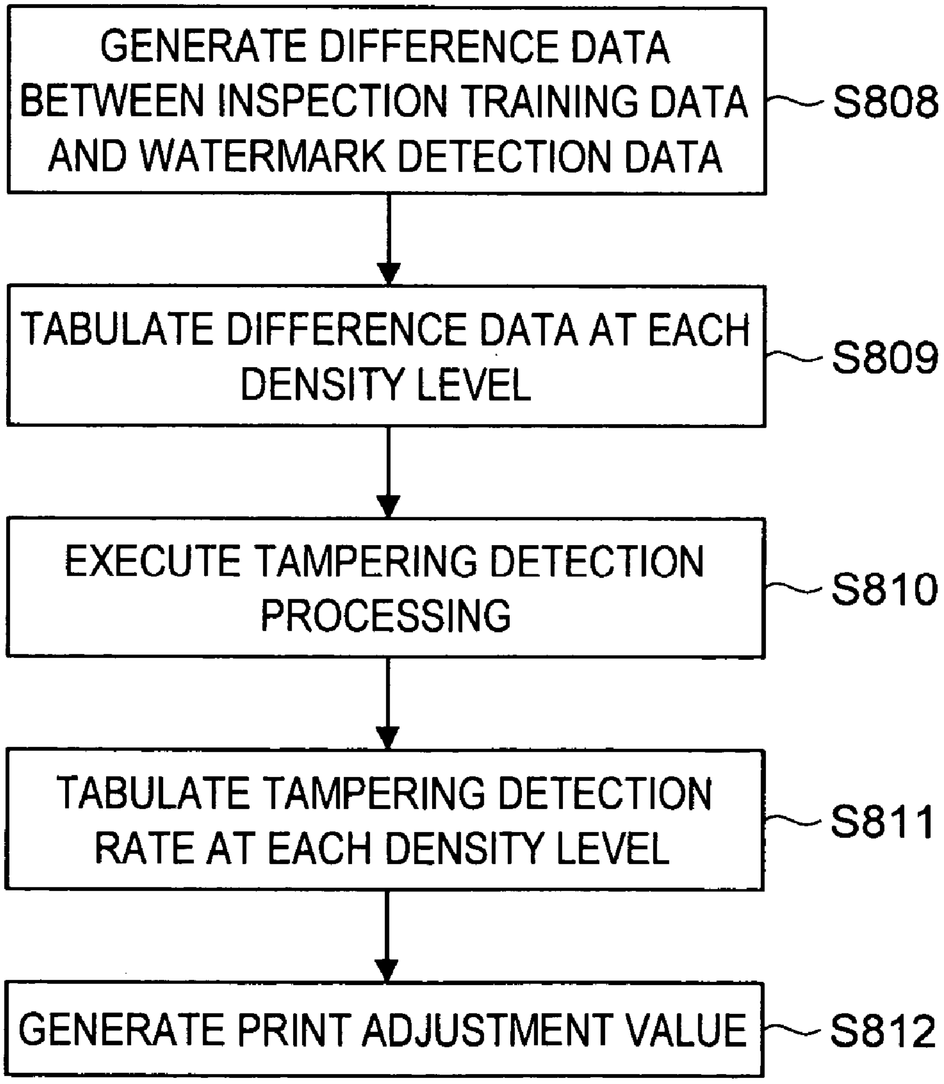
Figure 20:
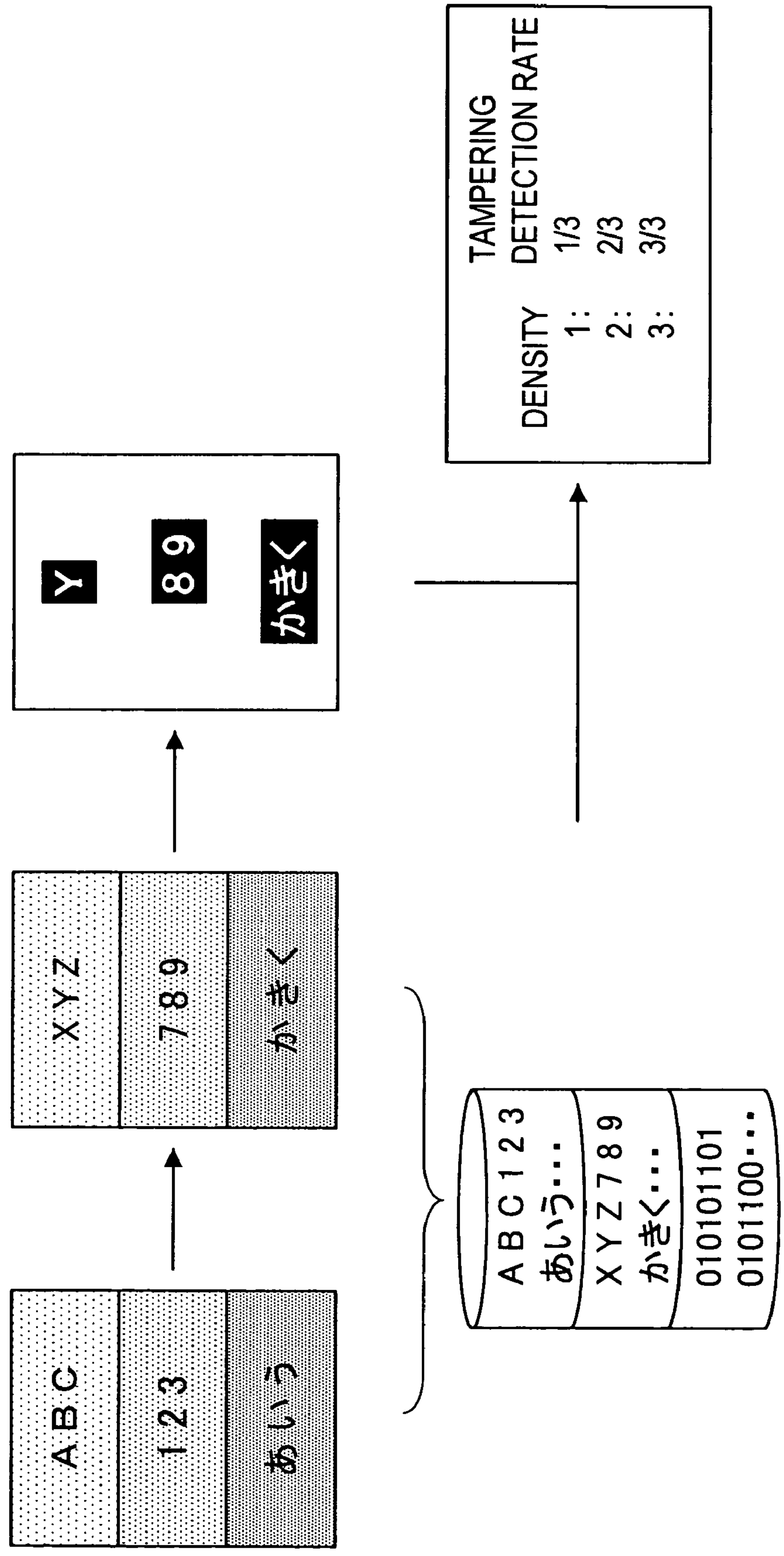
Figure 21:
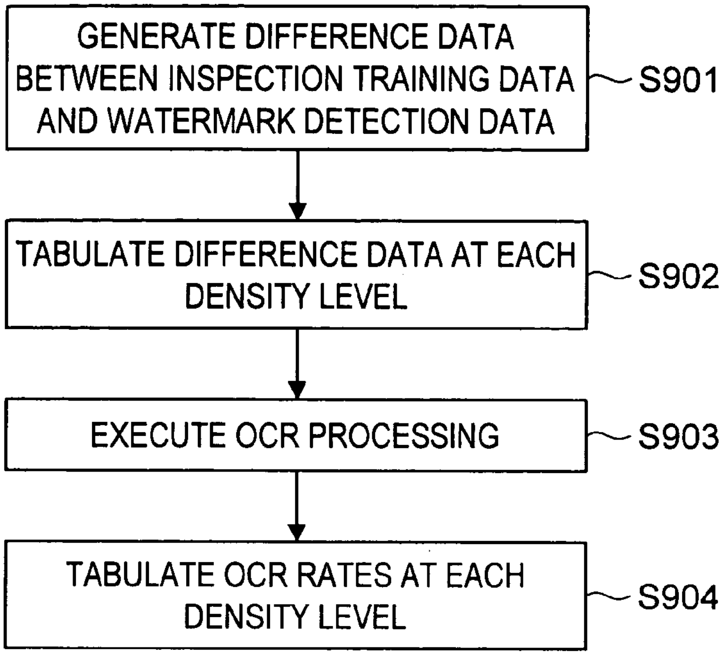
Figure 22:
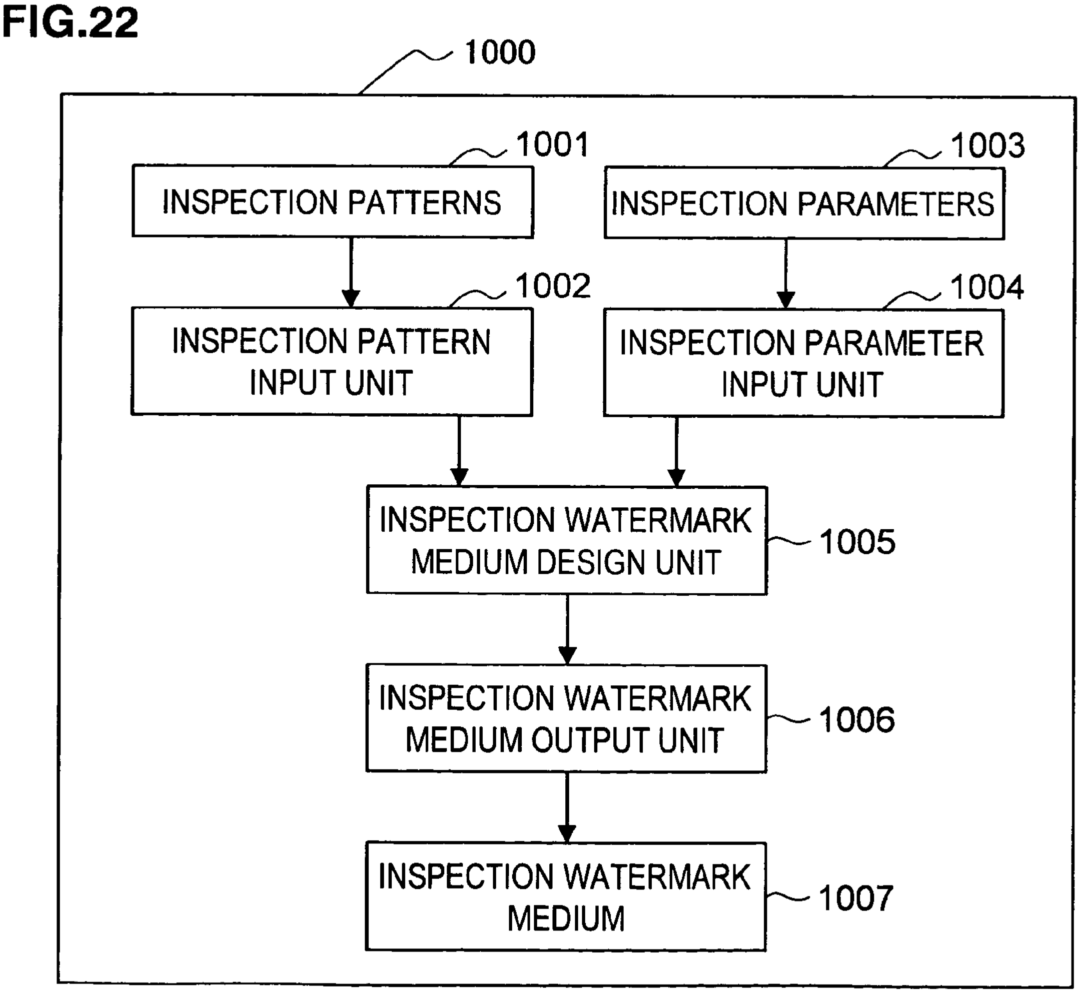
Figure 23:
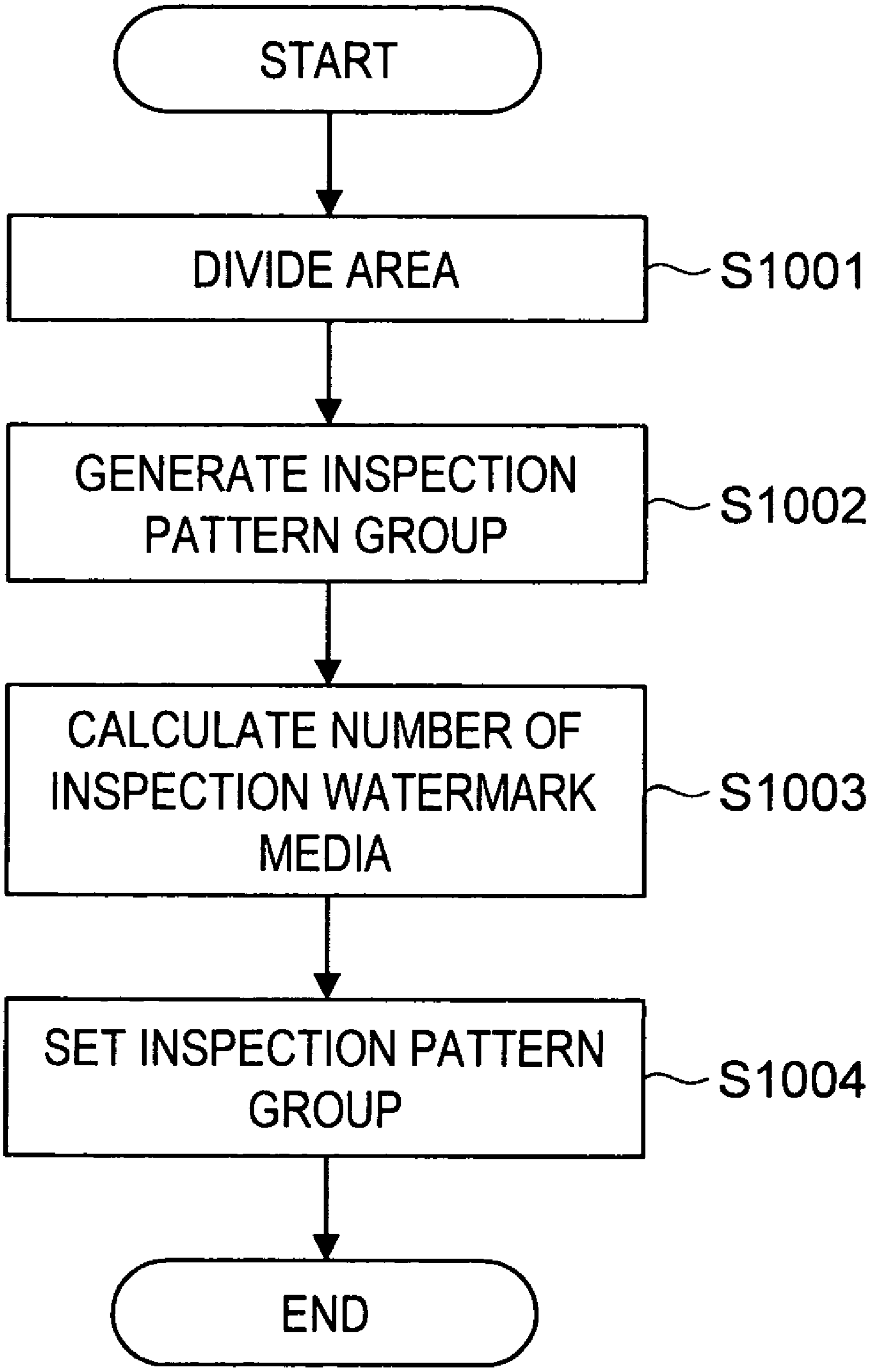
Figure 24:
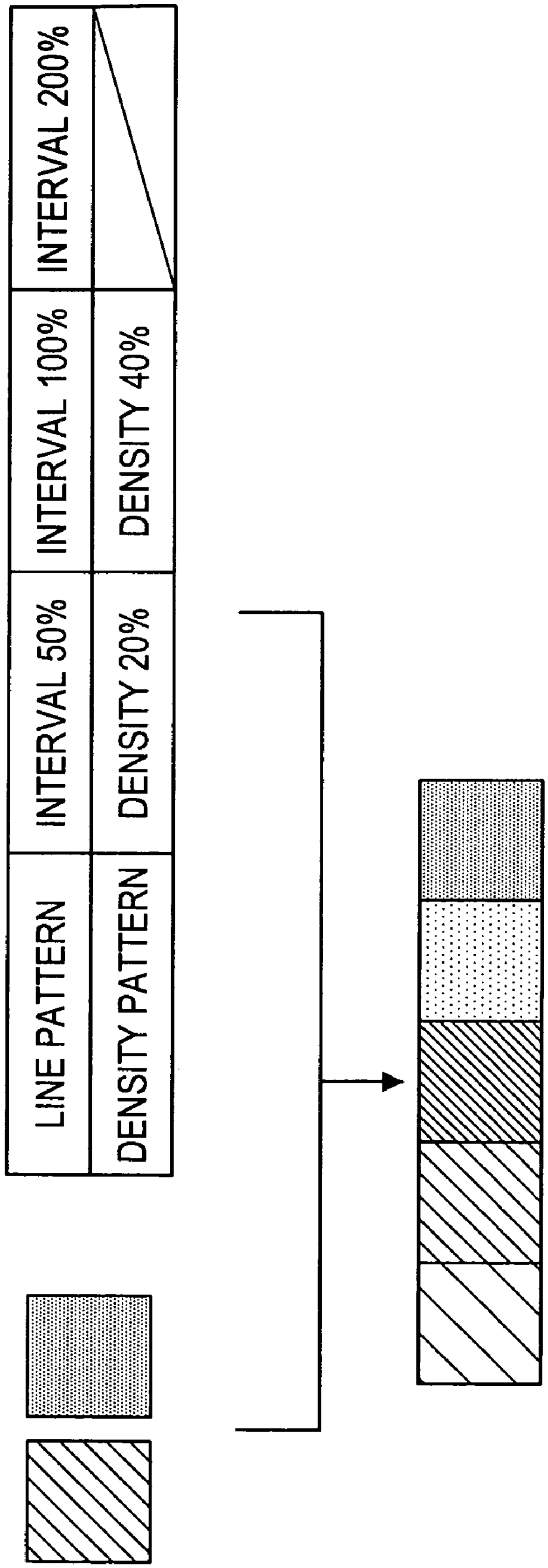
Figure 25:
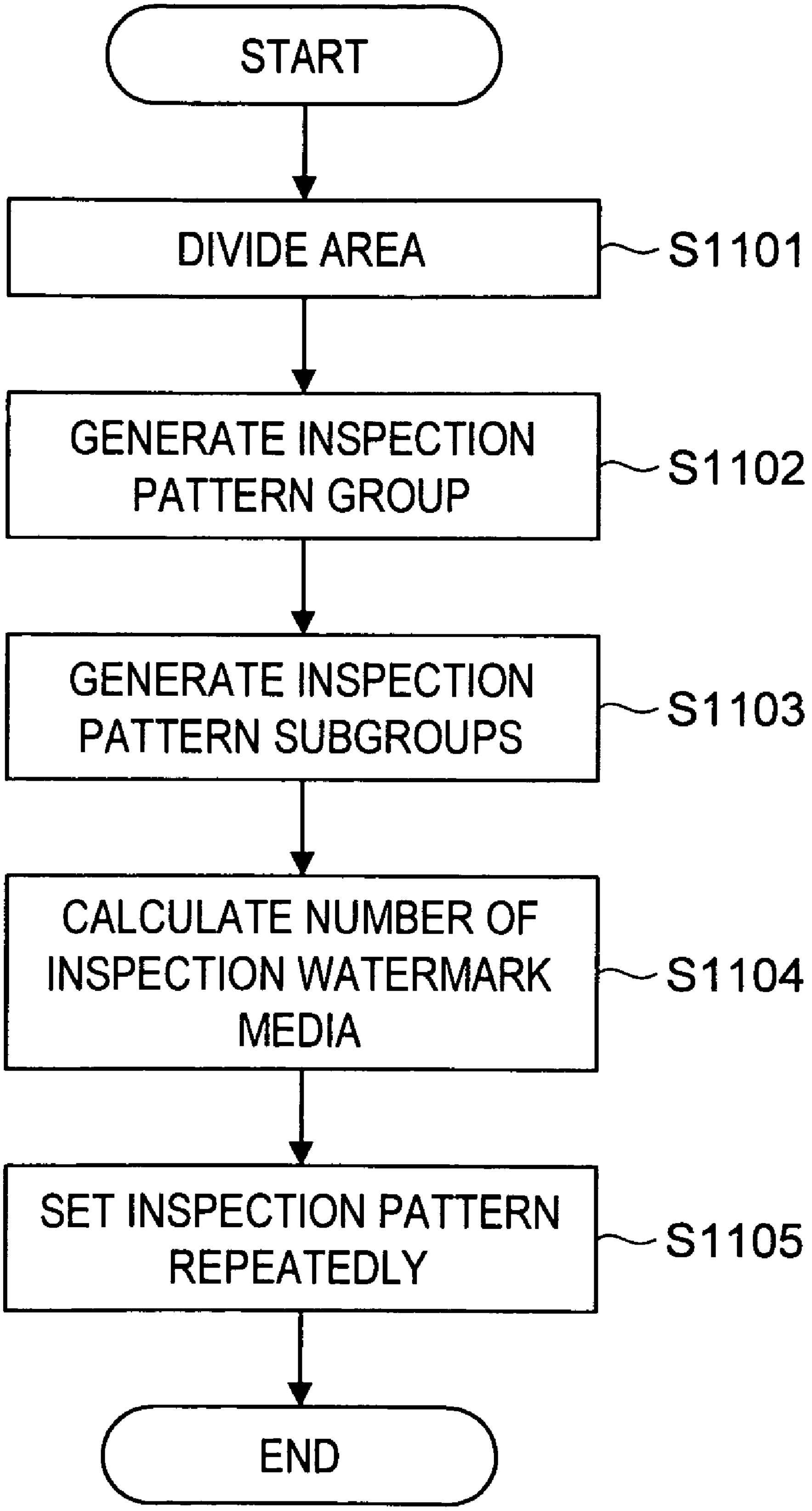
Figure 26:
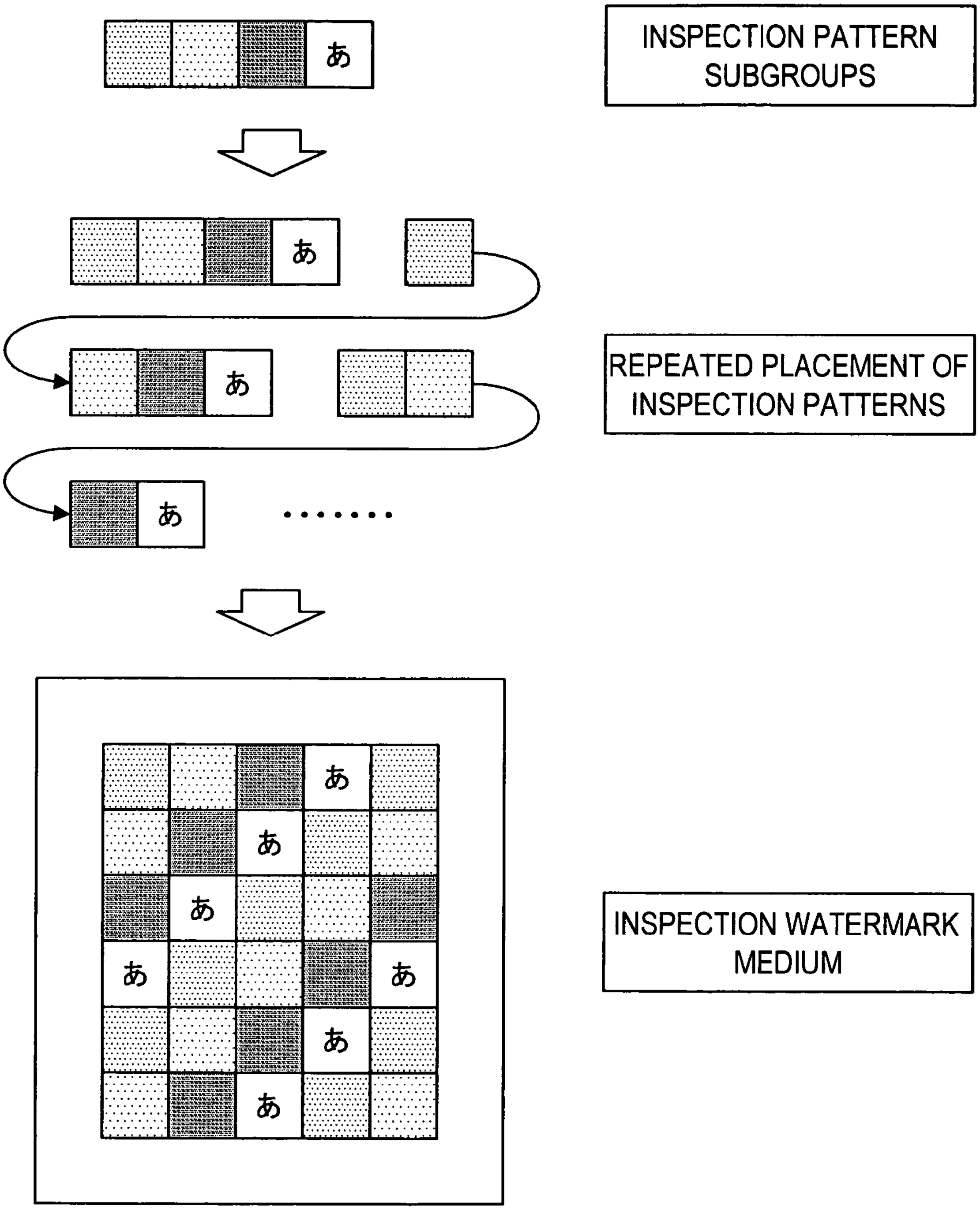
Figure 27:
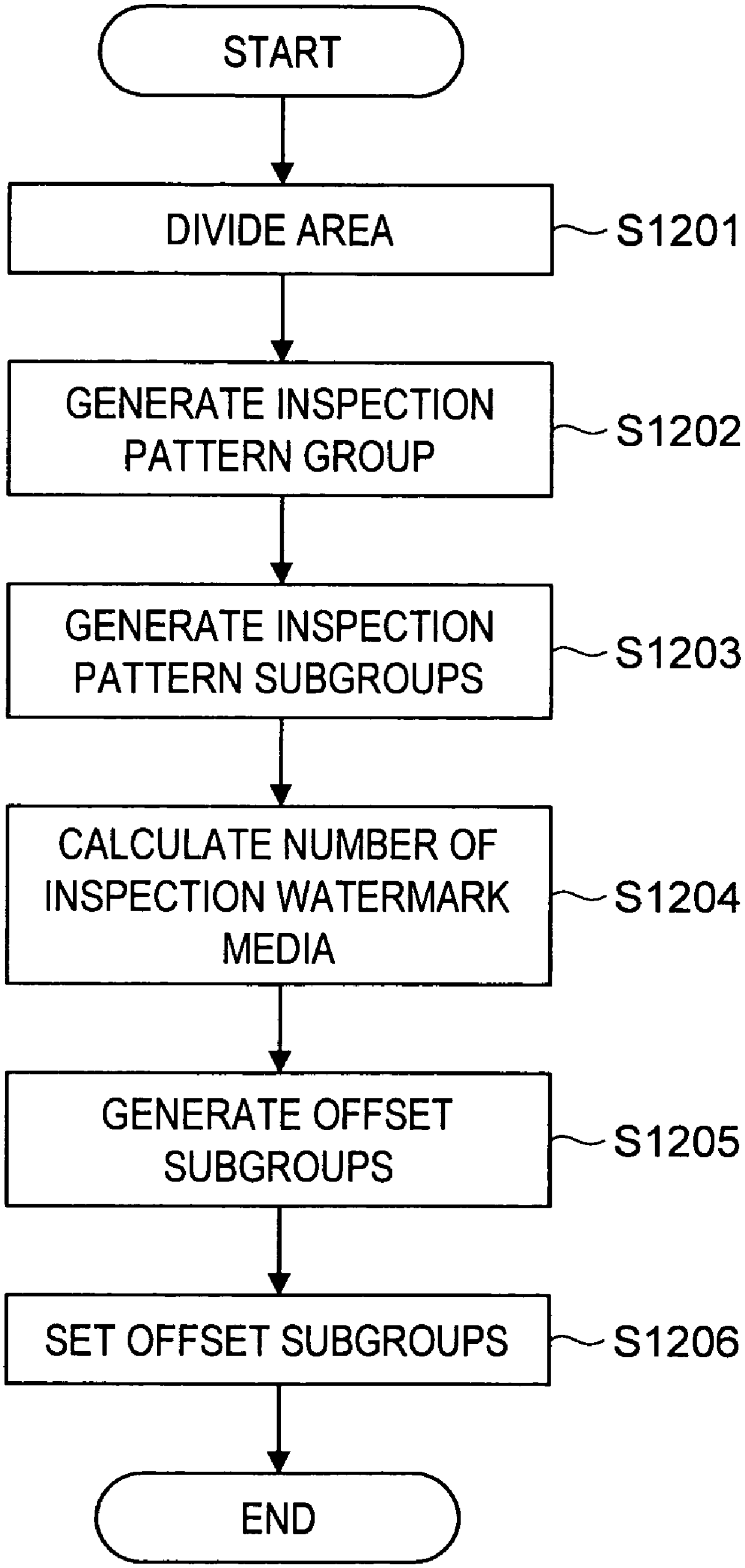
Figure 28:
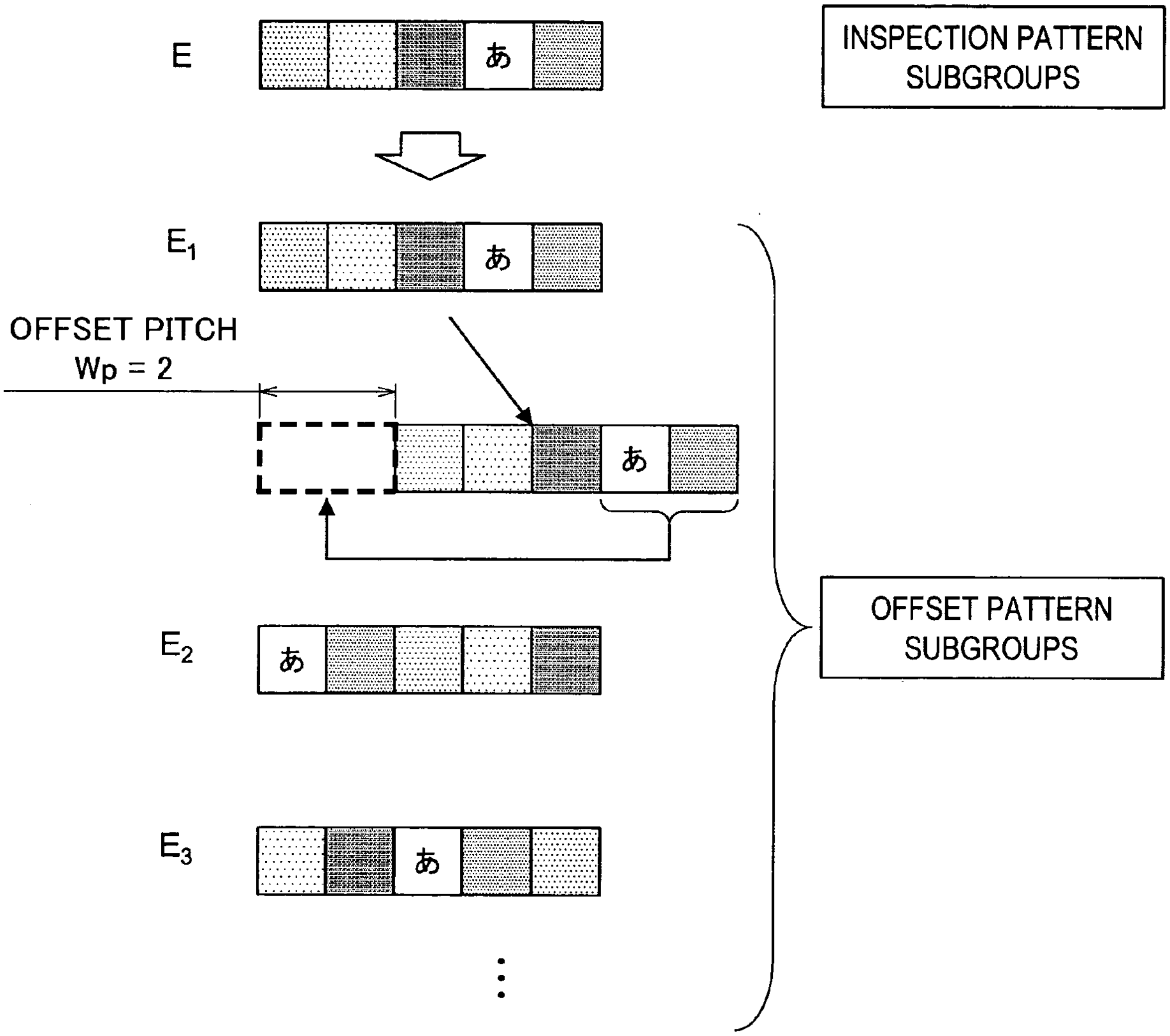
Figure 29:
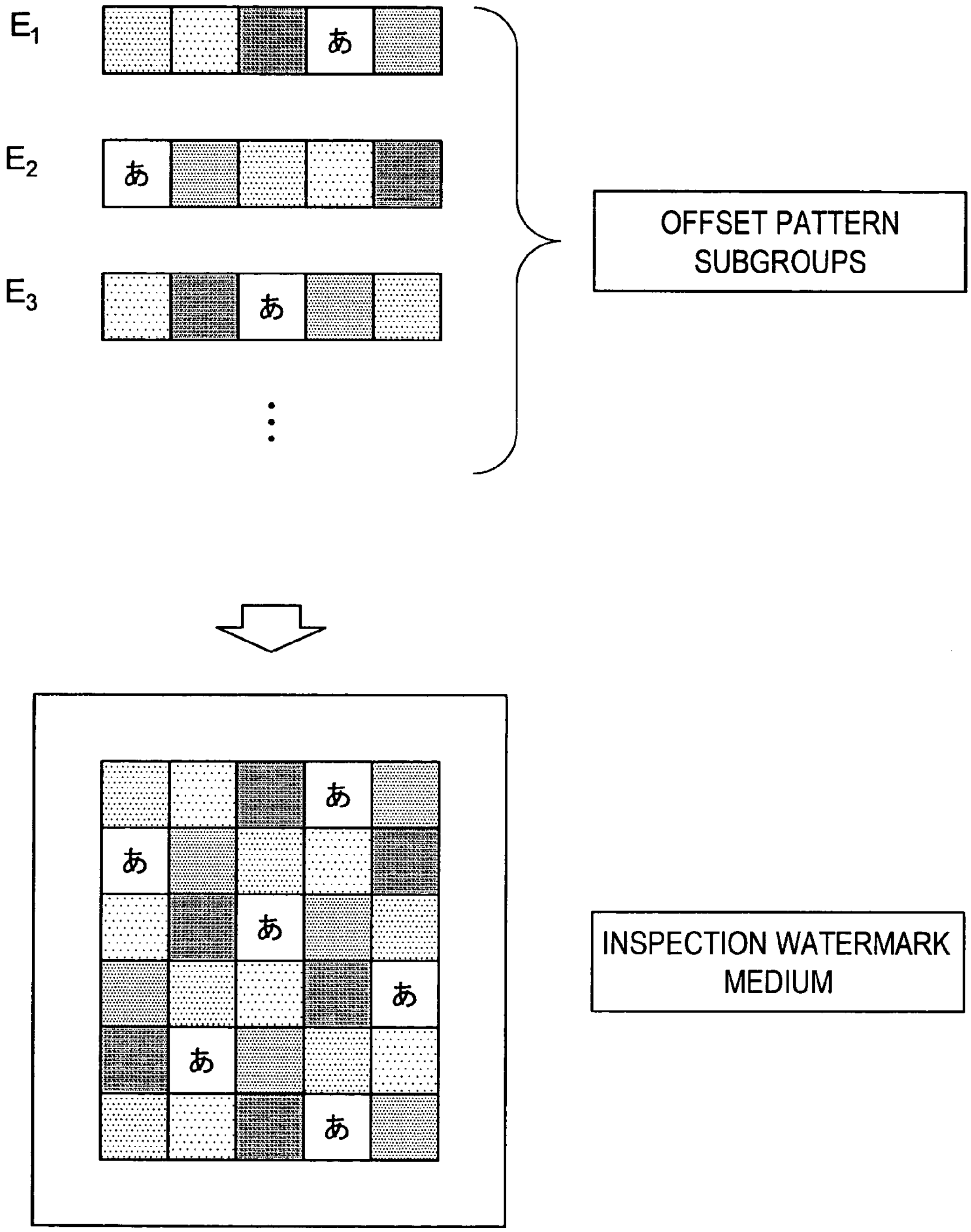

FIG. 6 presents a detailed flowchart of the watermark quality judgment processing (S113);

FIG. 7 shows the structure adopted in a second embodiment;

FIG. 8 presents a flowchart of the operations executed in the second embodiment;

FIG. 9 presents a detailed flowchart of the watermark quality judgment processing (S113) executed in a third embodiment;

FIG. 10 illustrates the adjustment value matrix generation processing (S303);

FIG. 11 presents a detailed flowchart of the watermark quality judgment processing (S113) executed in a fourth embodiment;

FIG. 12 shows mask processing (S 402) executed for a high-error area;

FIG. 13 presents a detailed flowchart of the watermark quality judgment processing (S113) executed in a fifth embodiment;

FIG. 14 shows the processing executed (S503) to tabulate data on a plurality of watermark media;

FIG. 15 shows the structure adopted in a sixth embodiment;

FIG. 16 presents a flowchart of the operations executed in the sixth embodiment;

FIG. 17 shows the structure adopted in a seventh embodiment;

FIG. 18 presents a detailed flowchart of the inspection watermark generation processing (S111) executed in an eighth embodiment;

FIG. 19 presents a detailed flowchart of the watermark quality judgment processing (S113) executed in the eighth embodiment;

FIG. 20 shows the density level-based tampering detection rate tabulation processing (S 811);

FIG. 21 presents a detailed flowchart of the watermark quality judgment processing (S113) executed in a ninth embodiment;

FIG. 22 shows the structure adopted in a tenth embodiment;

FIG. 23 presents a flowchart of the processing executed by the inspection watermark medium design unit in the tenth embodiment;

FIG. 24 presents a detailed flowchart of the inspection pattern group generation processing (S1002) executed in the tenth embodiment;

FIG. 25 presents a flowchart of the processing executed by the inspection watermark medium design unit in an eleventh embodiment;

FIG. 26 presents a detailed flowchart of the inspection pattern group placement processing (S1102 through S1104) executed in the eleventh embodiment;

FIG. 27 presents a detailed flowchart of the inspection pattern group placement processing (S1004) executed in a twelfth embodiment;

FIG. 28 presents a detailed flowchart of the transition pattern group generation processing (S1202) executed in the twelfth embodiment; and FIG. 29 presents a detailed flowchart of the transition pattern group placement processing (S1203) executed in the twelfth embodiment.

DETAILED DESCRIPTION OF THE PREFERRED EMBODIMENT

The following is a detailed explanation of the preferred embodiments of the print medium quality adjustment system, the inspection watermark medium output device, the watermark quality inspection device, the adjusted watermark medium output device, the print medium quality adjustment method and the inspection watermark medium according to the present invention, given in reference to the attached drawings. It is to be noted that in the specification and the drawings, the same reference numerals are assigned to components assuming substantially identical functions and structural features to preclude the necessity for a repeated explanation thereof.

First Embodiment

Figure 1:
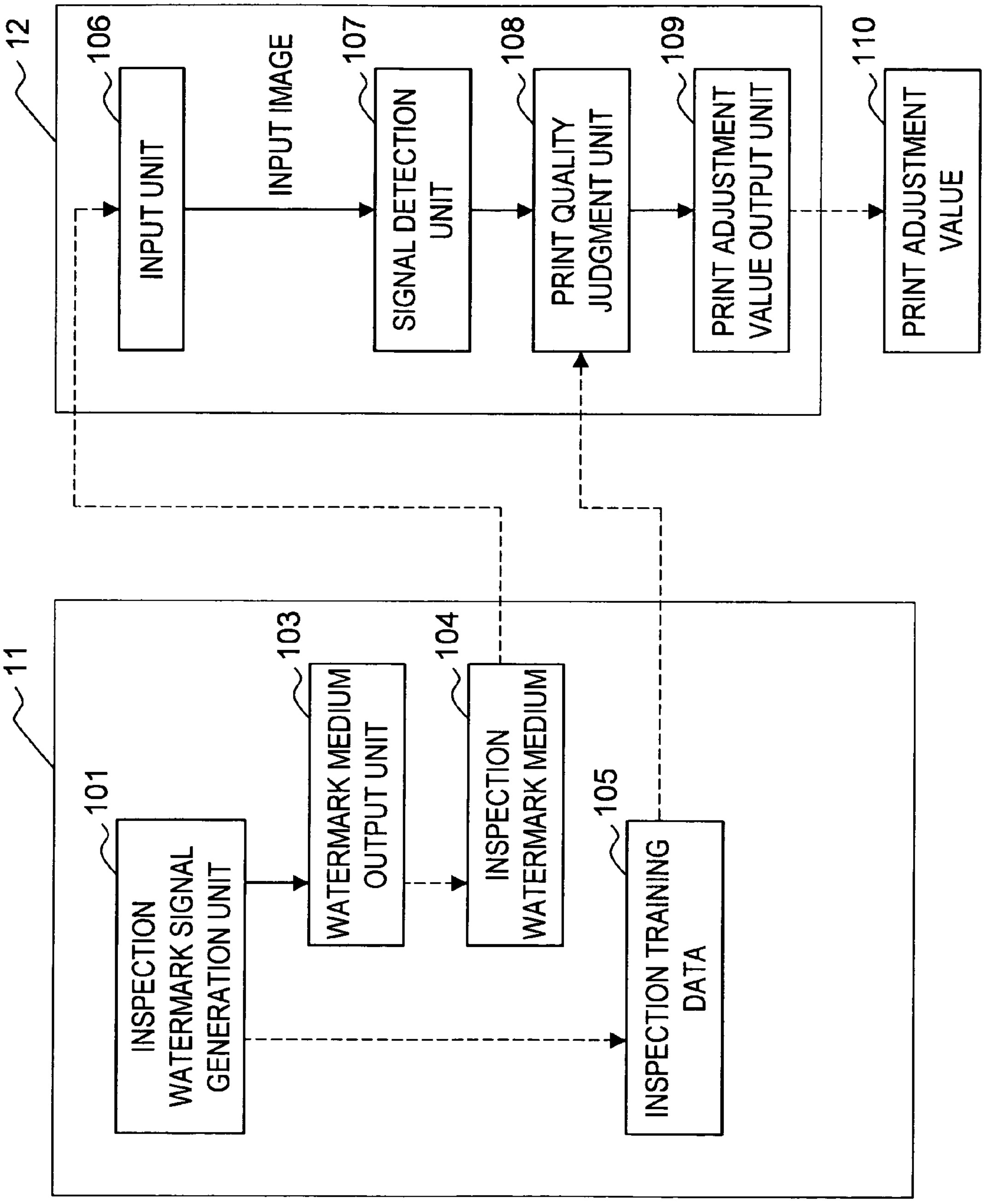

FIG. 1 shows the structure adopted in the first embodiment. In reference to the embodiment, an inspection watermark medium output device 11 and a watermark quality inspection device 12 in FIG. 1 are explained.

(Inspection Watermark Medium Output Device 11)

As shown in FIG. 1, the inspection watermark medium output device 11 includes an inspection watermark signal generation unit 101 and an inspection medium output unit 103. The inspection watermark signal generation unit 101 is an operational part that generates a plurality of inspection watermark signals by varying watermark signal parameters and generates a watermark signal image by disposing the plurality of inspection watermark signals thus generated in an arbitrary arrangement. The inspection medium output unit 103 is an operational part that prints a watermark image onto a medium, embodied as an output device such as a printer. An inspection watermark medium 104 is a print medium with the inspection watermark embedded therein, which is handled physically. Inspection training data 105 contain digitally recorded therein the watermark signals printed in the inspection watermark medium.

(Watermark Quality Inspection Device 12)

As shown in FIG. 1, the watermark quality inspection device 12 includes an input unit 106, a signal detection unit 107, a print quality judgment unit 108 and a print adjustment value output unit 109. The input unit 106 embodied as an input means such as a scanner, is an operational part that takes an image of a print medium into a computer as a multi-value gradation image. The signal detection unit 107 is an operational part that detects a signal embedded in the input image by executing filter processing. Embedded watermark information is extracted from the detected signal. The print quality judgment unit 108 is an operational part that judges the watermark quality by comparing digitally input inspection training data 105 with the watermark information obtained at a preceding stage. The print adjustment value output unit 109 is an operational part that outputs based upon the results of quality judgment obtained at a preceding stage a print adjustment value used to improve the print quality. The print adjustment value 110 is output as print adjustment information. It may be recorded in a physical medium or it may be processed as data in the computer.

The watermark quality inspection device 12 may determine the print adjustment value by using a plurality of inspection media 104 and a plurality of sets of inspection training data 105 input thereto.

Next, in reference to FIGS. 2 through 6, the operations executed in the embodiment adopting the structure described above are explained.

Figure 2:
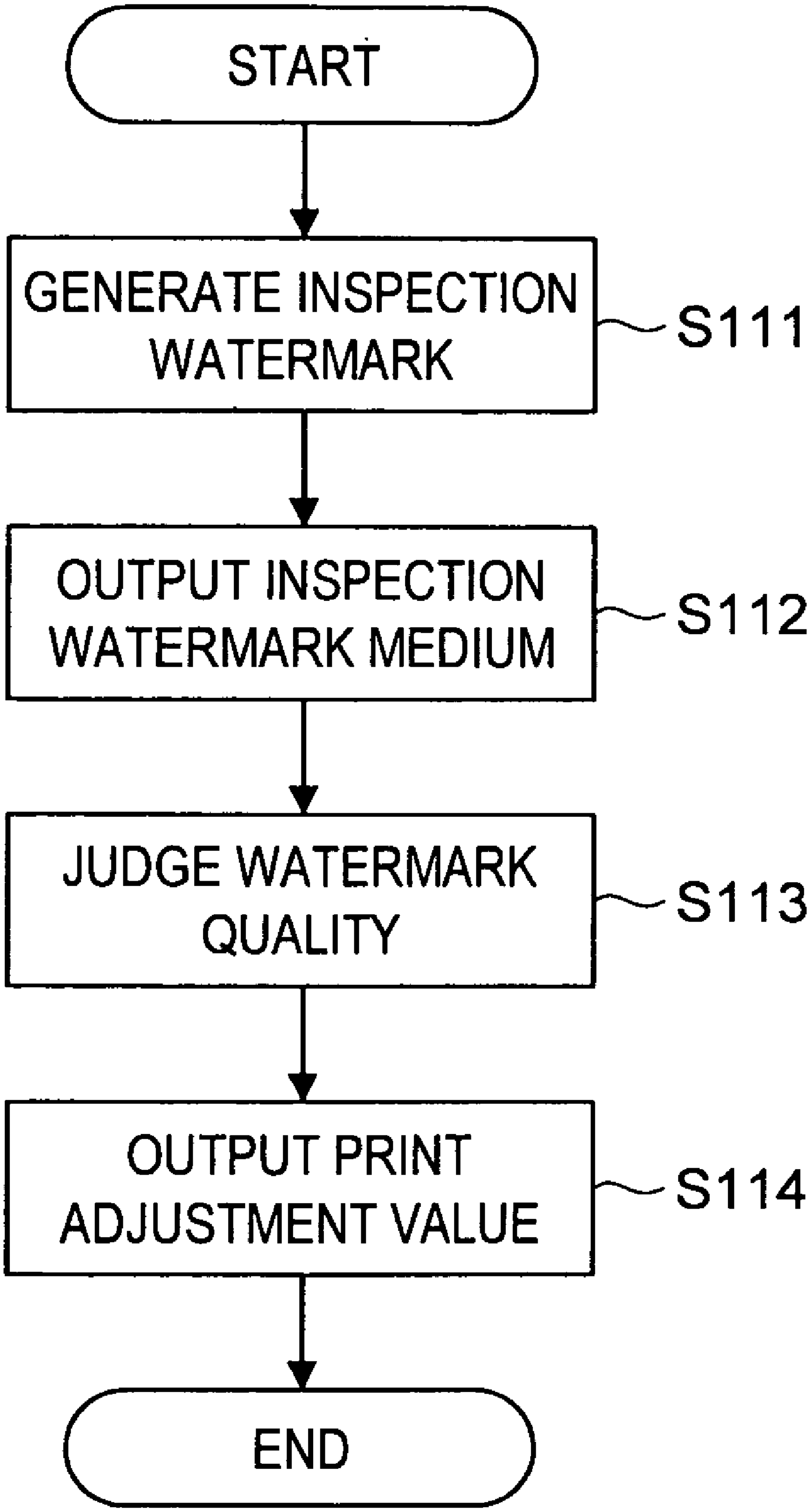

In reference to FIG. 2, the overall operation executed in the embodiment is briefly explained.

First, an inspection watermark is generated at the inspection watermark signal generation unit 111 (step S111). This inspection watermark generation step is to be described in further detail later in reference to FIGS. 3 through 5. The inspection watermark medium is then output by the watermark medium output unit 103 (step S112). Nest, the watermark quality is judged by the print quality judgment unit 108 (step S113). This watermark quality judgment step is to be described in further detail later in reference to FIG. 6. The print adjustment value output unit 109 then outputs the print adjustment value (step S114).

Figure 3:
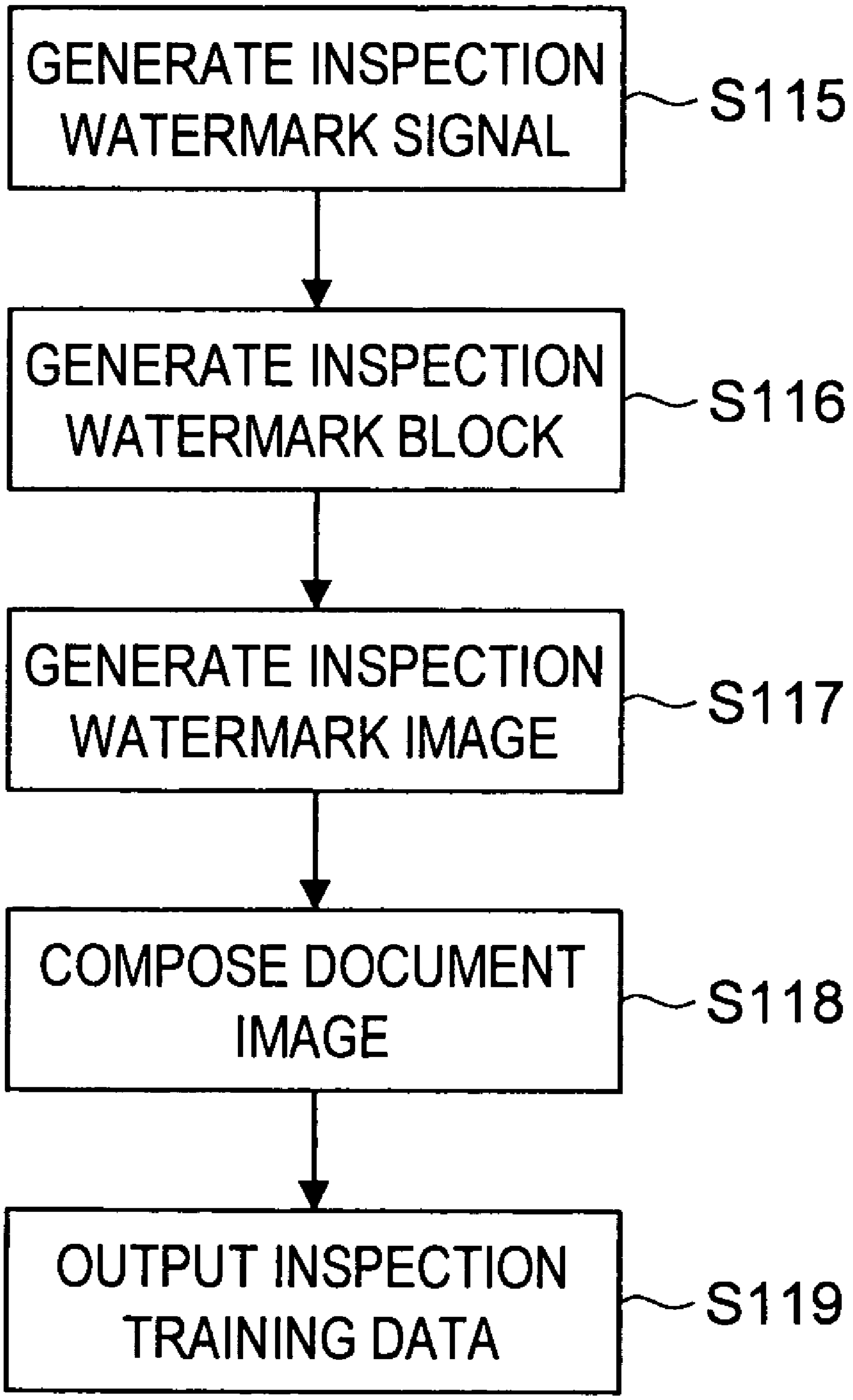
Figure 4:
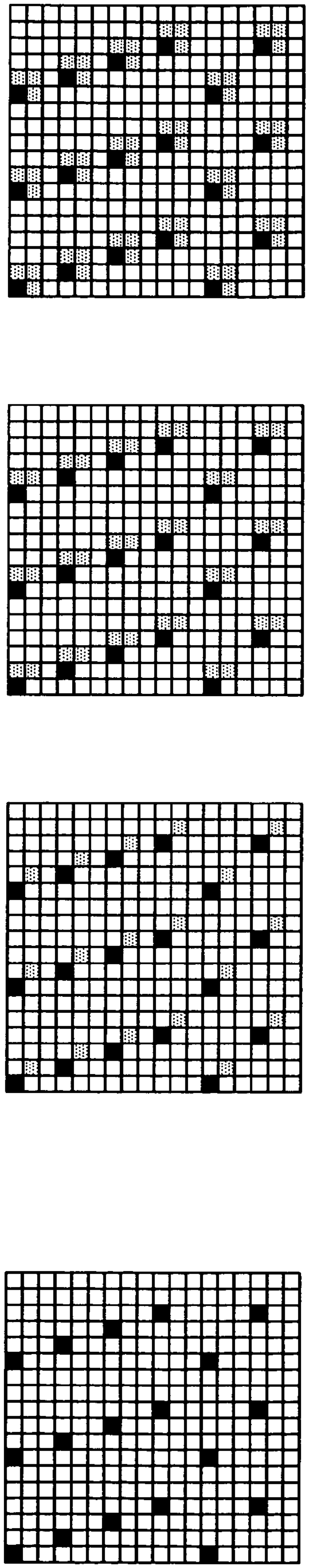
FIG. 4 illustrates the inspection watermark signal generation processing (S115)
Figure 5:
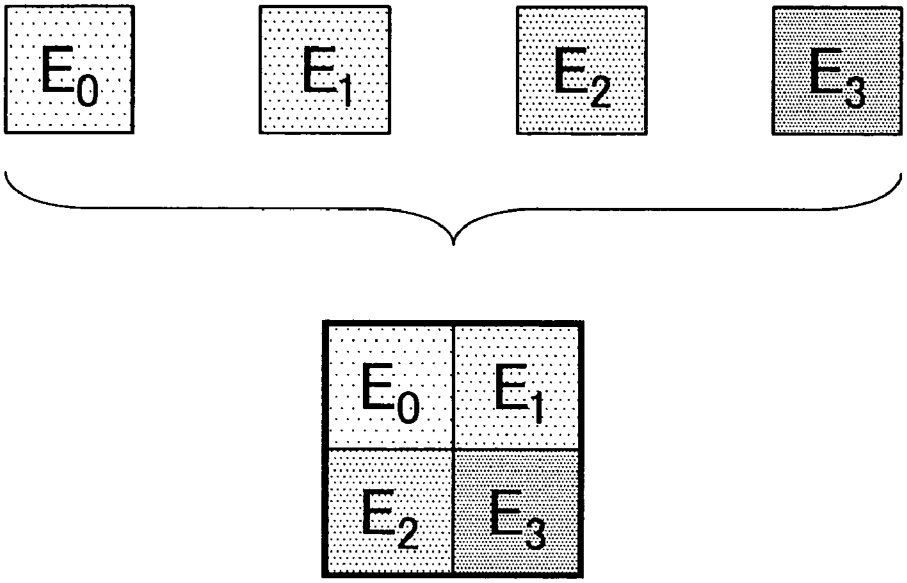
FIG. 5 illustrates the inspection watermark block generation processing (S116)

The inspection watermark generation processing (step S111) is now explained in reference to FIGS. 3 through 5.

FIG. 3 is a detailed flowchart of the inspection watermark generation processing (step S111).

As shown in FIG. 3, processing in steps S115 through S119 is executed in sequence during the inspection watermark generation processing (step S111). The following is an explanation of the processing executed in each step.

(Inspection Watermark Signal Generation Processing (Step S115))

FIG. 4 illustrates the inspection watermark signal generation processing (step S115). Inspection watermarks EN is generated by varying the density level N (1 . . . n) of a watermark signal S (S is a signal pattern assuming two or more values) used in regular information embedding. The watermark signal may be generated by adopting, for instance, the technology disclosed in Japanese Laid Open Patent Publication No. 2003-209676. The watermark signal disclosed in the publication conveys a specific dot (black pixel) arrangement to express a wave with a given wavelength and directionality. It is to be noted that the watermark signal generation technology disclosed in the publication simply represents an example of technology that may be adopted to enable the inspection watermark signal generation processing (step S115), and for this reason, a detailed explanation thereof is not provided. In addition, it goes without saying that the inspection watermark signal generation processing (step S115) may be executed by adopting another watermark signal generation technology.

The inspection watermark signal EN undergoing the watermark signal detection needs to have signal characteristics that allow the inspection watermark signal to be detected through the same signal detection method as that adopted for the watermark signal S. The watermark signal generated through the method disclosed in Japanese Laid Open Patent Publication No. 2003-209676 is detected via a Gabor filter. For this reason, the detection is facilitated by adding pattern dots so as to emphasize the frequency characteristics of the signal. Accordingly, the inspection watermark signal EN is generated by adding N emphasizing signal dots around each dot in the signal, as shown in FIG. 4. In order to maintain the desired level of uniformity in the printed watermark, emphasizing signal dots are also disposed with matching density over the areas other than the frequency characteristics portions (the areas where the upper left dots are diagonally aligned in FIG. 4).

(Inspection Watermark Block Generation Processing (Step S116))

FIG. 5 illustrates the inspection watermark block generation processing (step S116). The n types of inspection watermark signals each generated at a density level N (1 . . . n) are each disposed in an arbitrary pattern and thus, an inspection watermark block B is generated. The inspection watermark signals are arranged so that they form a rectangle, as shown in FIG. 5, with the watermarks following the one at the upper right set in a sequence matching the order of the density levels to the lower left. However, the inspection watermark signals may be set in a different sequence, or they may be set so as to form a different shape, e.g., they may be set side-by-side from left to right in a single row. Alternatively, an inspection watermark block may be generated by disposing only some of the n types of inspection watermarks having been generated. Furthermore, a plurality of inspection watermark blocks may be generated by selectively using different inspection watermarks.

(Inspection Watermark Image Generation Processing (Step S117))

The inspection watermark signal block B is uniformly disposed over a medium image to be printed. If a plurality of inspection watermark blocks have been generated, all the inspection watermark blocks may be disposed uniformly. Alternatively, the optimal watermark block may be selectively disposed at a specific position on the medium image by, for instance, disposing an inspection watermark block constituted with inspection watermarks with high density levels at the peripheral area of the image.

(Document Image Generation Processing (Step S118))

A document image to be set in the foreground in the printout is combined with the watermark image having been generated at a preceding stage. The document image containing therein characters or an image is protected via the watermark. A single document image is disposed reiteratively so as to match up with each of the inspection watermark blocks. In addition, a completely colorless image may be used as the document image in order to print out the watermark alone for the print quality inspection. The document image is combined with the watermark image by overwriting the print medium image on the watermark image at each pixel.

(Inspection Training Data Output Processing (Step S119))

The information embedded in the inspection watermark is output as inspection training data T. The output format may be identical to the format assumed in the watermark information signal string, or information having been compressed through encoding may be output.

The inspection watermark generation processing (step S111) in the flowchart in FIG. 2 is executed as described above. Now, the watermark quality judgment processing (step S113) is explained in detail.

FIG. 6 presents a detailed flowchart of the watermark quality judgment processing step (S113).

As shown in FIG. 6, processing in steps S120 through S122 is executed in sequence during the watermark quality judgment processing step (S113). The following is an explanation of the processing executed in each step.

(Processing for Generating Difference Data Between Inspection Training Data and Watermark Detection Data (Step S120))

The inspection training data T are compared with watermark information detected from the input inspection medium image. The comparison is executed in units of individual watermark signals and the difference relative to the training data is recorded in correspondence to each signal. Then, watermark signal information in the inspection training data is set on a matrix, thereby constituting a training information matrix Tm. In addition, watermark signal values detected from the input inspection watermark medium image are set on a matrix, thereby constituting a detection information matrix Vm. Then, a difference matrix Dm representing the difference between the training matrix Tm and the detection information matrix Vm is set. 0 is set for the difference matrix Dm if the training matrix Tm and the detection information matrix Vm indicate equal values, whereas 1 is set for the difference matrix Dm if the training matrix Tm and the detection information matrix Vm do not match.

(Density Level-Based Difference Tabulation Processing (Step S121))

Based upon the difference matrix Dm thus obtained, the difference data are tabulated in correspondence to the individual inspection watermark code density levels and signal erroneous detection rates each corresponding to a specific density level are determined.

(Print Adjustment Value Generation Processing (Step S122))

An adjustment density level that achieves an allowable error rate determined in advance in correspondence to the signal erroneous detection rates at the various density levels is selected as the print adjustment value. The allowable error rate may be determined by, for instance, actually measuring the signal erroneous detection rate at a watermark medium printed out in an ideal printing environment. Alternatively, the allowable error rate may be calculated in correspondence to the error correction capability achieved through watermark information coding. The print adjustment value thus output is used in the print adjustment processing to adjust the watermark density level.

(Advantage of the First Embodiment)

In the first embodiment described above, the print adjustment value to be used to adjust the watermark print quality of a watermark on a print medium in a specific watermark printing environment can be output simply by outputting and inspecting a single inspection medium.

Second Embodiment

FIG. 7 shows the structure adopted in the second embodiment.

An adjusted watermark medium output device 21 achieved in the embodiment is now explained in reference to FIG. 7.

(Adjusted Watermark Medium Output Device 21)

The adjusted watermark medium output device 21 includes a document image generation unit 202, a watermark information generation unit 204, a print adjustment value input unit 205, an adjusted watermark image generation unit 206 and an inspection medium output unit 207, as shown in FIG. 7.

Document data 201 are created by using a document preparation tool or the like. The document image generation unit 202 is an operational part that creates an image printed on a medium. More specifically, the document image includes a white pixel area where no image is printed and a black pixel area where an image is printed in black ink. Embed information 203 may be information (a character string, an image or audio data) embedded as a watermark signal in the medium. The watermark information generation unit 204 is an operational part that executes N-dimensional coding (N is a value equal to or greater than 2) on a numerical value obtained by digitizing the embed information 203. A print adjustment value 110 is the print adjustment information obtained as has been explained in reference to the first embodiment. It may be recorded in a physical medium or it may be processed as data on a computer. The print adjustment value input unit 205 is an operational part to which the print adjustment value 110 having been obtained by executing an inspection is input. The adjusted watermark image generation unit 206 is an operational part that generates the watermark by using the print adjustment value. The document image generation unit 202, the watermark information generation unit 204 and the adjusted watermark image generation unit 206 may be embodied as operational parts on a single computer. The inspection medium output unit 207 which is an operational part that prints the watermark image onto a medium, may be an output device such as a printer. A watermark medium 208, which is an adjusted print medium having been output from the watermark output unit 103, is handled physically.

It is to be noted that the adjusted watermark medium output device 21 may be embodied as a device identical to the inspection watermark medium output device 11 achieved in the first embodiment.

The operations executed in the embodiment adopting the structure described above are now explained. FIG. 8 presents a flowchart of the operations executed in the second embodiment. The following explanation focuses on watermark image formation processing (step S211) and watermark adjustment processing (step S212).

(Print Adjustment Value Input Processing (Step S210))

The print adjustment value 110 is first input via the print adjustment value input unit 205.

(Watermark Image Formation Processing (Step S211))

A watermark image is then formed. The watermark image may be generated by adopting, for instance, the technology disclosed in Japanese Laid Open Patent Publication No. 2003-209676. The watermark image forming unit disclosed in the publication executes N-dimensional coding (N is a natural number assuming a value equal to or greater than 2 and the coded bit string is referred to as a "coded word"). The watermark image is formed by allocating each symbol in the coded word to a watermark signal prepared in advance. It is to be noted that since the watermark image forming technology disclosed in the publication simply represents an example that may be adopted to enable the watermark image formation processing (step S211), a detailed explanation thereof is not provided. In addition, it is obvious that the watermark image formation processing (step S211) may be executed by adopting another watermark image forming technology.

(Watermark Adjustment Processing (Step S212))

Based upon the input print adjustment value, the density level is adjusted for the watermark signals on the print medium. The density adjustment level is referenced in correspondence to the print adjustment value and the density level is set to the corresponding value.

(Watermark Medium Output Processing (Step S213))

The watermark medium with the density level thereof having been adjusted is then output.

(Advantage of the Second Embodiment)

As explained above, the second embodiment allows the watermark print quality of a watermark printed on a print medium to be adjusted and a high-quality watermark medium to be printed by using the print adjustment value obtained through an inspection of a single inspection medium as input data.

Third Embodiment

Since the structure adopted in the embodiment is substantially identical to the structure achieved in the first embodiment having been explained in reference to FIG. 1, a repeated explanation is omitted.

The operations executed in the embodiment are explained in reference to FIGS. 9 and 10.

The embodiment is characterized by the watermark quality judgment processing (step S113) executed as part of the operations in the first embodiment explained in reference to FIG. 2. FIG. 9 presents a detailed flowchart of the watermark quality judgment processing (step S113) executed in the embodiment. Steps S301 through S304 are executed in sequence, as shown in FIG. 9, during the watermark quality judgment processing (step S113) in the embodiment. The following is an explanation of the individual steps.

(Processing for Generating Difference Data Between Inspection Training Data and Watermark Detection Data (Step S301))

This processing is executed in a manner substantially identical to that with which the processing for determining the difference data between the inspection training data and the watermark detection data is executed (step S120) in the first embodiment.

(Density Level-Based Difference Tabulation Processing (Step S302))

This processing is executed in a manner substantially identical to that with which the density level-based difference tabulation processing is executed (step S121) in the first embodiment.

(Adjustment Value Matrix Generation Processing (Step S303))

The following explanation focuses on the difference from the corresponding processing executed in the first embodiment. The processing executed in the third embodiment differs from that executed in the first embodiment in that adjustment value generation processing is executed by the print adjustment value generation unit based upon the error rate at each position.

As shown in FIG. 10, a position-dependent adjustment value matrix C of adjustment values each determined in correspondence to a specific position on the print medium is obtained based upon the different matrix D obtained at a preceding stage and representing the difference between the inspection training data and the detected watermark signal. The adjustment value matrix C is calculated by selecting NcMax+1 as the adjustment value for, for instance, signal block matrix B in the difference matrix D based upon the maximum density level NcMax with a detection error. If NcMax+1 is greater than the maximum density level NMax, NMax should be selected as the adjustment value.

(Print Adjustment Value Generation Processing (Step S304))

The adjustment value matrix C obtained at the preceding stage is then output as the print adjustment value. The print adjustment value thus output is used when adjusting the watermark density level during adjustment value processing.

(Advantage of the Third Embodiment)

In a printing environment in which the print quality becomes poor at a specific position on the print medium, the density level of the watermark signal can be raised locally instead of raising the overall density level by adopting the third embodiment so as to minimize the extent to which the legibility of the watermark medium becomes poor as explained above.

Fourth Embodiment

Since the structure adopted in the embodiment is substantially identical to the structure achieved in the first embodiment having been explained in reference to FIG. 1, a repeated explanation is omitted.

The operations executed in the embodiment are explained in reference to FIGS. 11 and 12.

The embodiment is characterized by the watermark quality judgment processing (step S113) executed as part of the operations in the first embodiment explained in reference to FIG. 2. FIG. 11 presents a detailed flowchart of the watermark quality judgment processing (step S113) executed in the embodiment. Steps S401 through S404 are executed in sequence, as shown in FIG. 11, during the watermark quality judgment processing (step S113) in the embodiment. The following is an explanation of the individual steps.

(Adjustment Value Matrix Extraction Processing (Step S401))

An adjustment value matrix is extracted by decoding the print adjustment values having been input.

(High Error Position Mask Processing (Step S402))

The embodiment differs from the second embodiment in that processing is executed by the adjusted watermark image generation unit 206 (see FIG. 7) to determine positions where information is to be embedded by checking error positions. The adjustment value matrix is divided into an arbitrary number of areas and each area with an adjustment value equal to or greater than a given threshold value is stored as a high-error area. The threshold value may be set to, for instance, the maximum adjustment value.

(Processing for Embedding Dummy Data at Mask Position (Step S403))

FIG. 12 illustrates the processing executed to embed dummy data at a mask position (step S403).

As shown in FIG. 12, each area designated as a high-error area is put aside as a dummy watermark area with no information contained therein. Information indicating the position of such a dummy signal area is first coded and then added at the beginning of the watermark information. The watermark image is generated by embedding an arbitrary signal in the dummy area and embedding watermark information in all the areas other than the dummy areas. The signal disposed in a dummy area is not detected during watermark verification processing. When dummy signals are set as described above, the number of watermark signals that can be placed decreases and thus, all the necessary signals may not be set in some cases. In such an event, the user should be notified that the adjustment cannot be executed. Alternatively, a notification indicating that complete adjustment cannot be executed and then the operation may continue to execute the print adjustment anyway.

(Advantage of the Fourth Embodiment)

As explain above, when there is a low-quality area where a detection error may occur readily even after executing the density level adjustment, watermark information can be embedded by avoiding such a low-quality area so as to sustain the print quality at a desired level in the fourth embodiment. In addition, print adjustment can be executed while sustaining uniform watermark density.

Fifth Embodiment

Since the structure adopted in the embodiment is substantially identical to the structure achieved in the first embodiment having been explained in reference to FIG. 1, a repeated explanation is omitted.

The operations executed in the embodiment are explained in reference to FIGS. 13 and 14.

The embodiment is characterized by the watermark quality judgment processing (step S113) executed as part of the operations in the first embodiment explained in reference to FIG. 2. FIG. 13 presents a detailed flowchart of the watermark quality judgment processing (step S113) executed in the embodiment. Steps S501 through S504 are executed in sequence, as shown in FIG. 13, during the watermark quality judgment processing (step S113) in the embodiment. The following is an explanation of the individual steps.

(Processing for Generating Difference Data Between Inspection Training Data and Watermark Detection Data (Step S501))

This processing is executed in a manner substantially identical to that with which the processing for determining the difference between the inspection training data and the watermark detection data is executed (step S120) in the first embodiment.

(Density Level-Based Difference Tabulation Processing (Step S502))

This processing is executed in a manner substantially identical to that with which the density level-based difference tabulation processing is executed (step S121) in the first embodiment.

(Watermark Media Tabulation Processing (Step S503))

The embodiment is distinguishable from the first embodiment in that the decode processing and tabulation processing are executed by the watermark quality judgment unit 113 by using a plurality of inspection watermark media.

Tabulated inspection data values are determined based upon training data input by using a plurality of sets of inspection data Tm (m =1 . . . M). Tabulated inspection data values may be determined by, for instance, tabulating the difference matrices Dm for the inspection watermark blocks Bm set at a given position in correspondence to the various sets of training data, tabulating the values indicated by the difference matrices Dm for areas with a common inspection watermark code density level within the inspection watermark blocks Bm and determining a watermark signal difference value at a density level n within the inspection watermark block Bm through the majority operation as shown in FIG. 14.

(Print Adjustment Value Generation Processing (Step S504))

The adjustment value matrix C obtained at the preceding stage is then output as the print adjustment value. The print adjustment value thus output is used when adjusting the watermark density level during adjustment value processing.

(Advantage of the Fifth Embodiment)

As explained above, in the fifth embodiment, in which the print adjustment value is determined by tabulating inspection information corresponding to a plurality of inspection watermark media and thus, an even higher level of precision is achieved in the print adjustment.

Six Embodiment

FIG. 15 shows the structure adopted in the sixth embodiment.

A watermark medium transmission device 61 and a watermark medium reception device 62 in FIG. 15 are explained in reference to the sixth embodiment. It is to be noted that the explanation is given in reference to the embodiment by focusing on the difference from the first and second embodiments.

(Watermark Medium Transmission Device 61)

The watermark medium transmission device 61 is an operational part that creates a watermarked document from document data and outputs the watermarked document thus created by compressing the document in a format optimal for transmission. As shown in FIG. 15, the watermark medium transmission device comprises a document image generation unit 202, a watermark information generation unit 204, a watermarked document generation unit 207 and a watermarked document compression unit 601. The watermarked document compression unit 601 is an operational part that reversibly compresses the watermarked document having been generated by adopting a given method. The watermarked document may be concurrently encrypted while it is compressed. A compressed watermarked document 602 is compressed watermarked document data which are handled electronically.

A host apparatus 603 saves the compressed document data and the print adjustment value and transmits the compressed document data and the print adjustment value saved therein to a network in response to a transmission request. The network 604 constitutes a communication path connecting the host apparatus 603 with at least one watermark medium reception device 62.

(Watermark Medium Reception Device 62)

The watermark medium reception device 62 is an operational part that receives the compressed document data and the print adjustment value and generates a watermarked document. As shown in FIG. 15, it comprises a reception unit 605, a watermark image reproduction unit 606 and a watermark medium output unit 607. The reception unit 605 is an operational part that receives the compressed document data and the print adjustment value via a network 121. The watermark image reproduction unit 606 is an operational part that expands the compressed document data and creates a watermark based upon the print adjustment value. The watermark medium output unit 607 is an operational part that outputs the watermark image thus formed. It is to be noted that the watermark medium output unit is constituted with a device having printing characteristics identical to those of the watermark medium output unit 103 (see FIG. 1) in the inspection watermark medium output device other than having been explained in reference to the first embodiment.

The operations executed in the embodiment adopting the structure described above are now explained. FIG. 16 presents a flowchart of the operations executed in the embodiment.

(Compressed Watermarked Document Expansion Processing (Step S608))

The compressed watermarked document having been input is expanded through a predetermined method. If the document was also encrypted while it was being compressed, the document is decrypted by using a key having been input or having been held in the watermark image reproduction unit. Document data and watermark signal data are obtained from the expanded watermarked document data.

(Document Image Processing (Step S609))

The document data having been obtained at the preceding stage are converted to an image.

(Watermark Signal Pattern Generation Processing (Step S610))

A watermark signal formed by using the watermark data is disposed on the image.

(Watermark Adjustment Processing Executed by Using Print adjustment value (step S611))

The watermark image having been obtained at the preceding stage is adjusted based upon the print adjustment value having been input.

(Composition Processing for Combining Document Image and Watermark (step S612))

A watermark document image is formed by combining the document image with the watermark image having been adjusted at the preceding stage.

(Advantage of the Sixth Embodiment)

As explained above, in the sixth embodiment, highly accurate watermark printing is enabled even when a watermarked document originating from a remote location is printed out.

Seventh Embodiment

FIG. 17 shows the structure adopted in the seventh embodiment.

As shown in FIG. 17, the embodiment differs from the sixth embodiment in that the print adjustment value is directly input to the watermark medium reception device instead of transmitting it via a network.

The operations executed in the embodiment are now explained. It is to be noted that the explanation focuses on the difference from the sixth embodiment.

The print adjustment value having been obtained through, for instance, the method explained in reference to the first embodiment is stored in advance at the watermark medium reception device. A watermarked document generated based upon the document data having been received and the print adjustment value is printed out.

(Advantage of the Seventh Embodiment)

As explained above, the print adjustment value is stored in advance at the output device in the reception unit in the seventh embodiment. This eliminates the need to store the print adjustment value at the host apparatus, which, in turn, enables print adjustment when various types of output devices are used or when a new type of output device is used.

Eighth Embodiment

Since the structure adopted in the embodiment is substantially identical to the structure achieved in the first embodiment having been explained in reference to FIG. 1, a repeated explanation is omitted.

The operations executed in the embodiment are now explained in reference to FIGS. 18 through 20. It is to be noted that the explanation focuses on the difference from the first embodiment.

The embodiment is characterized by the inspection watermark generation processing (step S111) and the watermark quality judgment processing (step S113) executed as part of the operations in the first embodiment explained in reference to FIG. 2. FIG. 18 presents a detailed flowchart of the inspection watermark generation processing (step S111) executed in the embodiment. Steps S801 through S807 are executed in sequence, as shown in FIG. 18, during the inspection watermark generation processing (step S11) in the embodiment. The following is an explanation of the individual steps.

(Inspection Watermark Image Generation Processing (Step 803))

A tampering detection inspection watermark is generated by embedding document image characteristics information F needed for tampering detection processing in an inspection watermark En created based upon a watermark signal S which is a multi-value signal with n values. The characteristics information may be generated by adopting, for instance, the technology disclosed in Japanese Laid Open Patent Publication No. 2003-209676. The publication discloses a tampering detection function whereby tampering is detected based upon additional information provided for purposes of tampering detection together with embed information (e.g., confidential information).

Namely, the electronic watermark detection device disclosed in the publication comprises an embed signal number detection unit that detects the number of symbol units having been embedded while the confidential information was embedded in a document image, a filter output value calculation unit that calculates specific filter output values for an input image and records the calculated values each in correspondence to a specific embed area, an optimal threshold value judgment unit that calculates an optimal threshold value to be used to detect the number of symbol units having been embedded in the watermark image based upon the detection value provided by the embed signal number detection unit and the values calculated by the filter output value calculation unit, a detection signal count unit that detects the number of symbol units actually embedded in a watermark document image and a tampering judgment unit that makes a decision as to whether or not the watermark document image has been tampered with by comparing the detection value provided by the embed signal number detection unit with the count value provided by the signal detection count unit. Any illegal act such as adding a character string in a blank space in the document or erasing a character string with white-out or the like, having been committed on the print document can be detected and the tampered document portion can be identified without requiring the original document.

It is to be noted that the characteristics information generation method disclosed in the publication simply represents an example of technology that may be adopted to enable the inspection watermark image generation processing (step S803), and for this reason, a detailed explanation thereof is not provided. In addition, it goes without saying that the inspection watermark image generation processing (step S803) may be executed by adopting another characteristics information generation method.

(Inspection Tamper Area Generation Processing (Step S805))

An inspection tamper area is formed for purposes of inspection within an image with a size equal to the size of the inspection watermark image. The inspection tamper area is formed by, for instance, adding a given character or image, deleting a given character or image or replacing a portion of the document image having been composed at the preceding stage.

(Inspection Tamper Area Composition Processing (Step S806))

The inspection tamper area is added in units of individual pixels into the inspection watermark image so as to create a combined image. The resulting image is used in subsequent processing as an inspection watermark image. Since information on a tampered document obtained through tampering detection does not contain the information for the inspection tamper area, it is judged during watermark verification that the document has been tampered with.

(Inspection Training Data Output Processing (Step S807))

Inspection training data containing information indicating the position and the contents of the inspection tamper area in addition to the information having been explained in reference to the first embodiment are output.

FIG. 19 presents a detailed flowchart of the watermark quality judgment processing (step S113) executed in the embodiment. Steps S808 through S812 are executed in sequence, as shown in FIG. 19, during the watermark quality judgment processing (step S113) in the embodiment. The following is an explanation of the individual steps.

(Tampering Detection Processing (Step S810))

Tampering detection is executed for the inspection tamper area present on the inspection watermark medium. The tampering detection may be executed by adopting, for instance, the method disclosed in Japanese Laid Open Patent Publication No. 2003-209076. The character erasure tampering detection unit disclosed in the publication creates a character area extraction image with the pixels in character areas indicating the value 0 and pixels in the background areas indicating the value 1 by binarizing a document image having embedded therein confidential information with a predetermined threshold value, creates a symbol unit extraction image with pixels present in areas where no symbol units can be detected in the document image with the confidential information embedded therein indicating the value 0 and pixels present in areas where symbol units can be detected indicating the value 1 and detects tampering with the watermark document image by comparing the character area extraction image with the symbol unit extraction image (by generating a difference image).

A trade-off whereby either a tampered portion remains undetected or an untampered portion is erroneously detected as a tampered portion depending upon the detection level setting (the detection threshold value setting) is inherent such tampering detection. For this reason, the tampering detection needs to be executed a plurality of times by varying the tampering detection level. It is to be noted that the tampering detection method disclosed in the publication simply represents an example of technology that may be adopted to enable the tampering detection processing (step S810), and for this reason, a detailed explanation thereof is not provided. In addition, it goes without saying that the tampering detection processing (step S810) may be executed by adopting another tampering detection method.

(Density Level-Based Tampering Detection Rate Tabulation Processing (Step S811))

FIG. 20 illustrates density level-based tampering detection rate tabulation processing (step S811).

As shown in FIG. 20, the tampering detection judgment results obtained in correspondence to various inspection watermark code density levels are compared with tampering information in the inspection training data having been input and areas where tampering has been accurately detected are determined. The judgment results are tabulated in correspondence to each watermark density level and a tampering detection rate FR is calculated based upon the area size Es of the inspection watermark area, the inspection tampering EfN, the number of tampered portions that remained undetected Ff and the number of untampered portions erroneously detected as tampered portions fr. The tampering detection rate may be calculated as, for instance, FR=(EfN−Ff)/EfN+fr/Es.

(Print Adjustment Value Generation Processing (Step S812))

Based upon the signal erroneous detection rate and the tampering detection rate having been determined for each density level, a density level at which the allowable signal erroneous detection rate is achieved and a tampering detection level at which the erroneous detection rate is lower than the allowable erroneous tampering detection rate are determined and they are output as print adjustment values. The allowable error rate and the allowable erroneous detection rate may be determined in advance by measuring the signal erroneous detection rate and the tampering erroneous detection rate on a watermark medium printed in an ideal printing environment.

(Advantage of the Eighth Embodiment)

As described above, the tampering detection rate is factored in when adjusting the print quality of a watermark in a print medium to be used in tampering detection in the eighth embodiment and, as a result, a watermark medium that enables highly accurate tampering detection can be printed out.

Ninth Embodiment

While the ninth embodiment adopts a structure substantially identical to that of the first embodiment having been explained in reference to FIG. 1, it is distinguishable from the first embodiment in that the a document image is used as an inspection image in OCR processing during document image composition processing 118. Namely, in the document image composition processing (step S118), a plurality of inspection characters with varying levels of difficulty in OCR processing are selected and set on the document image. The characters are set so that they are evenly distributed over the inspection watermark portions with varying density levels.

The operations executed in the embodiment are explained in reference to FIG. 21.

The embodiment is characterized by the watermark quality judgment processing (step S113) executed as part of the operations in the first embodiment explained in reference to FIG. 2. FIG. 21 presents a detailed flowchart of the watermark quality judgment processing (step S113) executed in the embodiment. Steps S901 through S904 are executed in sequence, as shown in FIG. 21, during the watermark quality judgment processing (step S113) in the embodiment. The following is an explanation of the individual steps.

(Processing for Determining Difference Between Inspection Training Data and Watermark Detection Data (Step S901))

This processing is executed in a manner substantially identical to that with which the processing for determining the difference between the inspection training data and the watermark detection data is executed (step S120) in the first embodiment.

(Density Level-Based Difference Tabulation Processing (Step S902))

This processing is executed in a manner substantially identical to that with which the density level-based difference tabulation processing is executed (step S121) in the first embodiment.

(OCR Processing (step S903))

OCR recognition is executed in the inspection temper area on the inspection watermark medium. The data in the inspection tamper area are compared with the character information in the input inspection training data and the OCR recognition accuracy is measured as the ratio of the number of accurately recognized characters.

(Density Level-Based OCR Rate Tabulation Processing (Step S904))

The tampering detection judgment results having been obtained at the preceding stage are tabulated in correspondence to each inspection watermark code density level and thus, the character recognition accuracy for each density level is determined.

(Print Adjustment Value Generation Processing (Step S905))

A watermark density level assuring an erroneous recognition rate lower than a predetermined allowable erroneous recognition rate acceptable in practical use, which is calculated based upon the signal erroneous detection rate and the character recognition rate at each density level, is output as a print adjustment value. The allowable erroneous recognition rate may be ascertained by, for instance, measuring the erroneous recognition rate on a print medium on which data are printed out in an ideal printing environment.

(Advantage of the Ninth Embodiment)

In the ninth embodiment, the print quality of watermark print medium that undergoes OCR processing can be adjusted by taking into consideration the character recognition rate, which, in turn, makes it possible to print out a watermark medium enabling highly accurate OCR processing.

Tenth Embodiment

In the related art, an inspection pattern must be designed manually and thus, the inspection pattern design tends to be a laborious process. In addition, each time the required level of print quality changes or the number of items that must be inspected changes, the inspection pattern must be redesigned, to add to the already significant labor. Accordingly, methods for automatically designing an inspection watermark medium by providing a plurality of inspection patterns and inspection range parameters are explained in reference to the $10^{th}$ through $12^{th}$ embodiments.

FIG. 22 illustrates the structure adopted in the $10^{th}$ embodiment.

As shown in FIG. 22, an inspection watermark medium output device 1000 comprises an inspection pattern input unit 1002 to which inspection patterns 1001 are input, an inspection parameter input unit 1004 to which inspection parameters 1003 are input, an inspection watermark medium design unit 1005 and an inspection watermark medium output unit 1006, and is able to output an inspection watermark medium 1007.

The inspection patterns 1001 are a set of patterns that can be used to inspect the print quality and are constituted with image data on a computer. The shape or the area of the image data can be freely set. The inspection patterns are constituted with a set of, for instance, a dot pattern, a density gradation pattern, a line pattern and the like. It is to be noted that the inspection patterns 1001 (as well as the inspection pattern group and the inspection pattern subgroup to be detailed later) are equivalent to the inspection watermark signal block having been explained earlier in reference to the previous embodiments.

The inspection pattern input unit 1002 holds in memory or in a storage medium the inspection patterns 1001 having been input thereto.

The inspection parameters 1003 are a set of parameters based upon which a pattern to be used in the quality inspection is selected from the inspection patterns 1001, and include parameters such as the minimum density/maximum density levels set for inspection, the inspection color and the required inspection accuracy.

The inspection parameter input unit 1004 holds in memory or in a storage medium the inspection parameters 1003 having been input thereto.

The inspection watermark medium design unit 1005 generates a pattern to be used for inspection based upon the inspection patterns 1001 and the inspection parameters 1003, automatically sets the inspection pattern thus generated on an inspection watermark medium and thus automatically designs an inspection watermark medium to undergo quality inspection.

The inspection watermark medium output unit 1006 outputs as image data or a print medium the inspection watermark medium having been designed by the inspection watermark medium design unit 1005. A single inspection watermark medium or a plurality of inspection watermark media are output in correspondence to the inspection parameters.

An inspection watermark medium 1007, provided as image data or a print medium, holds the inspection pattern having been designed by the inspection watermark medium design unit 1005.

The operations executed in the embodiment adopting the structure described above are now explained in reference to FIGS. 23 and 24.

FIG. 23 presents a flowchart of the processing executed in the inspection watermark medium design unit 1005 in the embodiment.

(Inspection Area Division Processing (Step S1001))

The area over the inspection watermark medium is divided into inspection areas large enough for an inspection pattern placement. The area on the inspection watermark medium may be divided in, for instance, a lattice pattern. In addition, the area on the inspection watermark medium may be divided so that individual inspection areas have varying sizes and shapes.

(Inspection Pattern Group Generation Processing (Step S1002))

Based upon the inspection patterns, an inspection pattern group needed for inspection is generated in correspondence to the inspection parameters. For instance, all the inspection patterns to be used may be generated in correspondence to the inspection parameters and an inspection pattern group may be formed by linking all the inspection patterns, as shown in FIG. 24.

(Inspection Watermark Medium Number Calculation Processing (Step S1003))

The number of inspection patterns to be used for inspection is determined based upon the inspection parameters and the number of inspection watermark media needed for inspection is calculated in correspondence to the size of each inspection area and the number of inspection patterns. For instance, assuming that there are Es inspection patterns to be used, the inspection watermark medium is indicated as Sw×h and each inspection area assumes a ex×ey rectangular shape, the number ns of the inspection watermark media is determined as ns=(Sw/ex·Sh/ey)/Es.

(Inspection Pattern Placement Processing (Step S1004))

The corresponding inspection pattern is set in each inspection area on each inspection watermark medium. The inspection patterns may be set starting at the upper right position on the inspection watermark medium. However, they may be set in a different order.

(Advantage of the Tenth Embodiment)

As explained above, the inspection watermark medium output device adopting the structure described above in reference to the $10^{th}$ embodiment allows an inspection watermark medium to be automatically designed simply by providing a plurality of inspection patterns and parameters indicating a specific inspection range.

Eleventh Embodiment

Since the structure adopted in the embodiment is substantially identical to the structure achieved in the tenth embodiment having been explained in reference to FIG. 22, a repeated explanation is omitted.

FIG. 25 presents a flowchart of the processing executed in the 11$^{th}$ embodiment. It differs from the tenth embodiment in that identical inspection patterns are set at a plurality of positions on an inspection watermark medium. The following explanation focuses on the feature that distinguishes the 11$^{th}$ embodiment from the 10$^{th}$ embodiment.

(Area Division Processing (Step S1101))

The area on the inspection watermark medium is divided in a lattice pattern into W×H inspection areas each large enough to allow inspection pattern placement.

(Inspection Pattern Group Generation Processing (Step S1102))

Based upon the inspection patterns, an inspection pattern group needed for inspection is generated in correspondence to the inspection parameters. For instance, all the inspection patterns to be used in conjunction with the inspection parameters for inspection may be generated in correspondence to an inspection pattern group may be formed by linking all the inspection patterns, as shown in FIG. 24.

(Inspection Pattern Subgroup Generation Processing (Step S1103))

The inspection pattern group is divided into inspection pattern subgroups En (n=1 . . . N) with each subgroup holding an arbitrary number P of inspection patterns with P representing a value satisfying W×H<P.

(Inspection Watermark Medium Number Calculation Processing (Step S1104))

The number of inspection pattern subgroups is ascertained as the number of inspection watermark media. For instance, assuming that Es represents the number of patterns in the inspection pattern group and Pd represents the number of patterns in each inspection subgroup, the number ns of the inspection watermark media is calculated as ns=Es/Pd.

(Inspection Pattern Repeated Placement Processing (Step S1105))

The number Pd of patterns in each inspection pattern subgroup is compared with the number A of areas set on the inspection watermark medium, and if Pd<A, the inspection pattern group is set at a plurality of positions on the inspection watermark medium. The inspection patterns may be set along, for instance, the raster scanning direction starting at the upper left position on the inspection watermark medium, as shown in FIG. 26. If the division operation executed by using the number of areas A and the number of patterns Pd results in a remainder M, M patterns should be set so as to precede the inspection patterns. Alternatively, an arbitrary number of patterns may be added to the inspection pattern group so as to minimize or eliminate the remainder.

(Advantage of the Eleventh Embodiment)

As explained above, in the 11$^{th}$ embodiment, a quality inspection watermark medium to be used in quality inspection, which enables printing position-based quality evaluation can be automatically designed by disposing a single inspection pattern at a plurality of positions on inspection watermark media.

Twelfth Embodiment

Since the structure adopted in the embodiment is substantially identical to the structure achieved in the 10$^{th}$ embodiment having been explained in reference to FIG. 22, a repeated explanation is omitted.

FIG. 27 presents a flowchart of the processing executed in the 12$^{th}$ embodiment. It differs from the 11$^{th}$ embodiment in that dispersed placement processing is also executed by the inspection pattern placement processing unit. The following explanation focuses on the feature that distinguishes the 12$^{th}$ embodiment from the 11$^{th}$ embodiment.

The area division processing (step S1201) and the inspection pattern group generation processing (step S1202) are substantially identical to those executed in the 10$^{th}$ and 11$^{th}$ embodiments.

(Inspection Pattern Subgroup Generation Processing (Step S1203))

While this processing is substantially similar to the inspection pattern subgroup generation processing (step S1103) executed in the 11$^{th}$ embodiment, the number of patterns Pd in each inspection pattern subgroup is set equal to the number W of areas present along the shorter side of the area.

The inspection watermark medium number calculation processing (step S1204) executed in the 12$^{th}$ embodiment is substantially identical to that executed in the 10$^{th}$ and 11$^{th}$ embodiments.

(Transition Subgroup Generation Processing (Step S1205))

A transition subgroup is generated in correspondence to each subgroup by executing the following processing (1) through (4).

(1) A given inspection pattern subgroup En is designated as a first transition pattern En1.

(2) As shown in FIG. 28, a specific offset pitch Wp is selected for the individual patterns in the transition pattern En1 and En1 is sequentially shifted along a predetermined direction, i.e., either to the left or to the right, thereby obtaining a second transition pattern En2. The offset pitch Wp should assume a value that is a prime number but is not a devisor of the number Pd of the pattern subgroups.

(3) The operation described in (2) above is executed repeatedly H times to match the number H of areas present along a longer side of the area, thereby obtaining H transition pattern groups (En1 . . . EnH).

(4) The operation described in (2) and (3) above is executed for each inspection pattern subgroup En (n=1 . . . N), thereby obtaining transition subgroups Ebh (n=1 . . . N, h=1 . . . H).

(Transition Subgroup Placement Processing (Step 1206))

As shown in FIG. 29, the offset patterns (En1 . . . EnH) in each transition subgroup among the transition subgroups Enh (n=1 . . . N), h=1 . . . H) are sequentially set along the longer side of an inspection watermark medium, and thus, N inspection watermark media are generated.

(Advantage of the Twelfth Embodiment)

As explained above, the inspection watermark medium design unit in the 12$^{th}$ embodiment allows the inspection pattern to be evenly distributed on the inspection watermark medium, and automatically generates an inspection watermark medium that enables highly accurate printing position-based quality evaluation with a minimum number of inspection watermark media.

While the invention has been particularly shown and described with respect to preferred embodiments of the print medium quality adjustment system, the inspection watermark medium output device, the watermark quality inspection device, the adjusted watermark medium output device, the print medium quality adjustment method and the inspection watermark medium according to the present invention by referring to the attached drawings, the present invention is not limited to these examples and it will be understood by those skilled in the art that various changes in form and detail may be made therein without departing from the spirit, scope and teaching of the invention.

INDUSTRIAL APPLICABILITY

The present invention may be adopted in technologies for embedding/reading an electronic watermark in a print medium and, more specifically, it may be adopted in a print medium quality adjustment system, an inspection watermark medium output device, a watermark quality inspection device, an adjusted watermark medium output device, a print medium quality adjustment method and an inspection watermark medium.

What is claimed is:

1. A print medium quality adjustment system comprising an inspection watermark medium output device that outputs an inspection watermark medium to be used to inspect a print medium; and a watermark quality inspection device that inspects the quality of a watermark in the print medium, wherein:

a. the inspection watermark medium output device includes;

(1) an inspection watermark signal generation unit that generates a single inspection watermark signal or a plurality of inspection watermark signals, to be used for inspection, generates a watermark signal image by disposing the inspection watermark signal(s) in an arbitrary arrangement, and generates inspection training data having N-dimensionally encoded data indicating a numerical value, which are obtained by digitizing the inspection watermark signal(s), N being a positive integer equal to or greater than 2; and (2) an inspection medium output unit that outputs an inspection watermark medium to be used for inspection, created by printing the inspection watermark signal(s) onto a medium; and b. the watermark quality inspection device includes:

(1) an input unit that takes in the inspection watermark medium as a multi-value gradation input image;

(2) a signal detection unit that detects a signal embedded in the input image and extracts embedded watermark information from the signal;

(3) a print quality judgment unit that judges watermark quality by comparing the watermark information with the inspection training data input thereto; and (4) a print adjustment value output unit that outputs, based upon the results of the quality judgment, a print adjustment value to be used to improve the print quality, wherein the print adjustment value output unit determines an adjustment value, which is dependent on the position assumed at the print medium, in correspondence to the difference between the inspection training data and the watermark signal detected by the signal detection unit and then output the adjustment value thus determined as the print adjustment value, wherein the inspection training data are obtained by using at least part of the watermark information, and wherein the print quality judgment unit divides adjustment values, each determined in correspondence to a specific position at the print medium, into groups each representing one of an arbitrary number of areas, sets an area with an adjustment value equal to or greater than a predetermined threshold value as a high-error area and designates the high-error area as a dummy watermark area with no information contained therein.

2. A print medium quality adjustment system according to claim 1, further comprising:

an adjusted watermark medium output device that outputs an adjusted print medium based upon the print adjustment value input thereto, wherein:

the adjusted watermark medium output device includes;

a document image generation unit that creates a document image printed on a medium based upon document data;

a watermark information generation unit that N-dimensionally (N is a value equal to or greater than 2) encodes data indicating a numerical value, which are obtained by digitizing embed information to the embedded in a medium as a watermark signal;

a print adjustment value input unit to which the print adjustment value is input;

an adjusted watermark image generation unit that generates a watermark image based upon the document image and the watermark information by using the print adjustment value; and a medium output unit that outputs an adjusted watermark medium created by printing the watermark image onto a medium.

3. A print medium quality adjustment system according to claim 2, wherein:

the print adjustment value output unit outputs as the print adjustment value a watermark printing parameter that satisfies a predetermined allowable recognition error rate by adopting a character recognition technology.

4. A print medium quality adjustment system according to claim 1, wherein:

the inspection watermark medium output device generates a plurality of inspection watermark signals; and the print adjustment value output unit determines the print medium position-dependent adjustment value by executing tabulation processing on the plurality of inspection watermark signals.

5. A print medium quality adjustment system according to claim 1, wherein:

the adjusted watermark medium output device is connected with the inspection watermark medium output device and the watermark quality inspection device so as to receive at least the watermark image via the network.

6. A print medium quality adjustment system according to claim 5, wherein:

the adjusted watermark medium output device also receives the print adjustment value via the network.

7. A print medium quality adjustment system according to claim 1, wherein:

the inspection watermark signal generation unit embeds characteristics information indicating document image characteristics needed for tampering detection processing as the inspection watermark.

8. A print medium quality adjustment system according, to claim 1, wherein:

the inspection watermark signal includes a plurality of signals that specify different dot arrangements.

9. A print medium quality adjustment system according to claim 1, wherein:

a printing parameter of the inspection watermark signal is determined based upon a change in the print density value for the watermark signal image.

10. A print medium quality adjustment system according to claim 1, wherein:

a printing parameter of the inspection watermark signal is determined based upon a change in the arrangement of pixels constituting the watermark signal image.

11. A print medium quality adjustment system according to claim 1, wherein the inspection training data are electrical data that the inspection watermark signal generation unit obtains from the inspection watermark signal(s) entirely electrically, without a printing step.

12. A watermark quality inspection device that inspects a watermark quality of a watermark in a print medium by using an inspection watermark medium and inspection training data input thereto, comprising:

an input unit that takes in the inspection watermark medium as a multi-value gradation input image;

a signal detection unit that detects a signal embedded in the input image and extracts embedded watermark information from the signal;

a print quality judgment unit that judges the watermark quality by comparing the watermark information with the inspection training data input thereto; and a print adjustment value output unit that outputs, based upon the results of the quality judgment, a print adjustment value to be used to improve the print quality, wherein:

the inspection training data is obtained by N-dimensionally encoding data indicating a numerical value, which are obtained by digitizing a single inspection watermark signal or a plurality of inspection watermark signals, N being a positive integer equal to or greater than 2, and the inspection watermark medium is a medium with the inspection watermark signal(s) printed thereon, wherein the print adjustment value output unit determines an adjustment value, which is dependent on the position assumed at the print medium, in correspondence to the difference between the inspection training data and the watermark signal detected by the signal detection unit and then output the adjustment value thus determined as the print adjustment value, and wherein the print quality judgment unit divides adjustment values, each determined in correspondence to a specific position at the print medium, into groups each representing one of an arbitrary number of areas, sets an area with an adjustment value equal to or greater than a predetermined threshold value as a high-error area and designates the high-error area as a dummy watermark area with no information contained therein.

13. A watermark quality inspection device according to claim 12, wherein:

the inspection training data are obtained by using at least part of the watermark information.

14. A watermark quality inspection device according to claim 12, wherein:

the inspection watermark medium output device generates a plurality of inspection watermark signals; and the print adjustment value output unit determines the print medium position-dependent adjustment value by executing tabulation processing on the plurality of inspection watermark signals.

15. A watermark quality inspection device according to claim 12, wherein:

the print adjustment value output unit outputs as the print adjustment value a watermark printing parameter that satisfies a predetermined allowable recognition error rate by adopting a character recognition technology.

16. A watermark quality inspection device according to claim 12, wherein the inspection training data are electrical data that are obtained from the single inspection watermark signal or plurality of inspection watermark signals entirely electrically, without a printing step.

* * * * *